United States Patent [19]
McNelley et al.

[11] Patent Number: 5,550,754
[45] Date of Patent: Aug. 27, 1996

[54] TELECONFERENCING CAMCORDER

[75] Inventors: Steve McNelley, Capistrano; Eric Williams, Altadena, both of Calif.

[73] Assignee: Videoptic Research, San Juan Capistrano, Calif.

[21] Appl. No.: 242,131

[22] Filed: May 13, 1994

[51] Int. Cl.[6] .................................................. H05K 11/00
[52] U.S. Cl. .......................................... 364/514 A; 348/13
[58] Field of Search ......................... 364/514 A; 348/14, 348/15, 13, 19

[56] References Cited

U.S. PATENT DOCUMENTS

| | | |
|---|---|---|
| 4,400,725 | 8/1983 | Tanigaki . |
| 4,485,400 | 11/1984 | Lemelson et al. . |
| 4,604,668 | 8/1986 | Lemelson . |
| 4,819,101 | 4/1989 | Lemelson . |
| 4,829,555 | 5/1989 | Hashimoto . |
| 4,875,107 | 10/1989 | Heidt et al. . |
| 4,894,715 | 1/1990 | Uchikubo et al. . |
| 4,899,231 | 2/1990 | Maeda et al. . |
| 4,928,300 | 5/1990 | Ogawa et al. ............................ 348/14 |
| 4,928,301 | 5/1990 | Smoot . |
| 4,996,592 | 2/1991 | Yoshida . |
| 5,032,820 | 7/1991 | Tanikawa et al. ........................ 348/14 |
| 5,046,079 | 9/1991 | Hashimoto . |
| 5,061,992 | 10/1991 | Ueno ........................................ 348/14 |
| 5,111,498 | 5/1992 | Guichard et al. ......................... 348/14 |
| 5,117,285 | 5/1992 | Nelson et al. . |
| 5,142,562 | 8/1992 | Guichard et al. ......................... 348/14 |
| 5,151,727 | 9/1992 | Sasaki . |
| 5,157,512 | 10/1992 | Inada et al. . |
| 5,159,445 | 10/1992 | Gitlin et al. . |
| 5,162,915 | 11/1992 | Idera et al. . |
| 5,170,427 | 12/1992 | Guichard et al. ......................... 348/14 |
| 5,189,691 | 2/1993 | Dunpal . |
| 5,206,731 | 4/1993 | Takaiwa et al. . |
| 5,243,413 | 9/1993 | Gitlin et al. . |
| 5,249,053 | 9/1993 | Jain . |
| 5,253,286 | 10/1993 | Sano et al. ............................... 348/14 |
| 5,278,681 | 1/1994 | Gitlin et al. . |

Primary Examiner—Emanuel T. Voeltz
Assistant Examiner—Thomas Peeso
Attorney, Agent, or Firm—Price, Gess & Ubell

[57] ABSTRACT

A combination portable recording video camera and video-conferencing terminal is described, wherein a video camera and lens is adjustable so that it can either produce images of an operator's surroundings for recording on a medium such as video tape, as in normal recording video cameras, or of the operator as in video conferencing terminals. The device is preferably provided with a video display screen that functions as a viewfinder in video-graphing the surroundings. The device is equipped with communication electronics that establish a connection over a network, and then transmits video and audio signals from the device while displaying video signals and reproducing audio signals that arrive over the network. Attempts by the network to establish a connection with the device result in the device automatically establishing the connection. Then the device activates its internal recording systems to play the prerecorded video message and transmit it over the network. The operator is later able to play the recorded signals and view them on the device's built-in display.

65 Claims, 12 Drawing Sheets

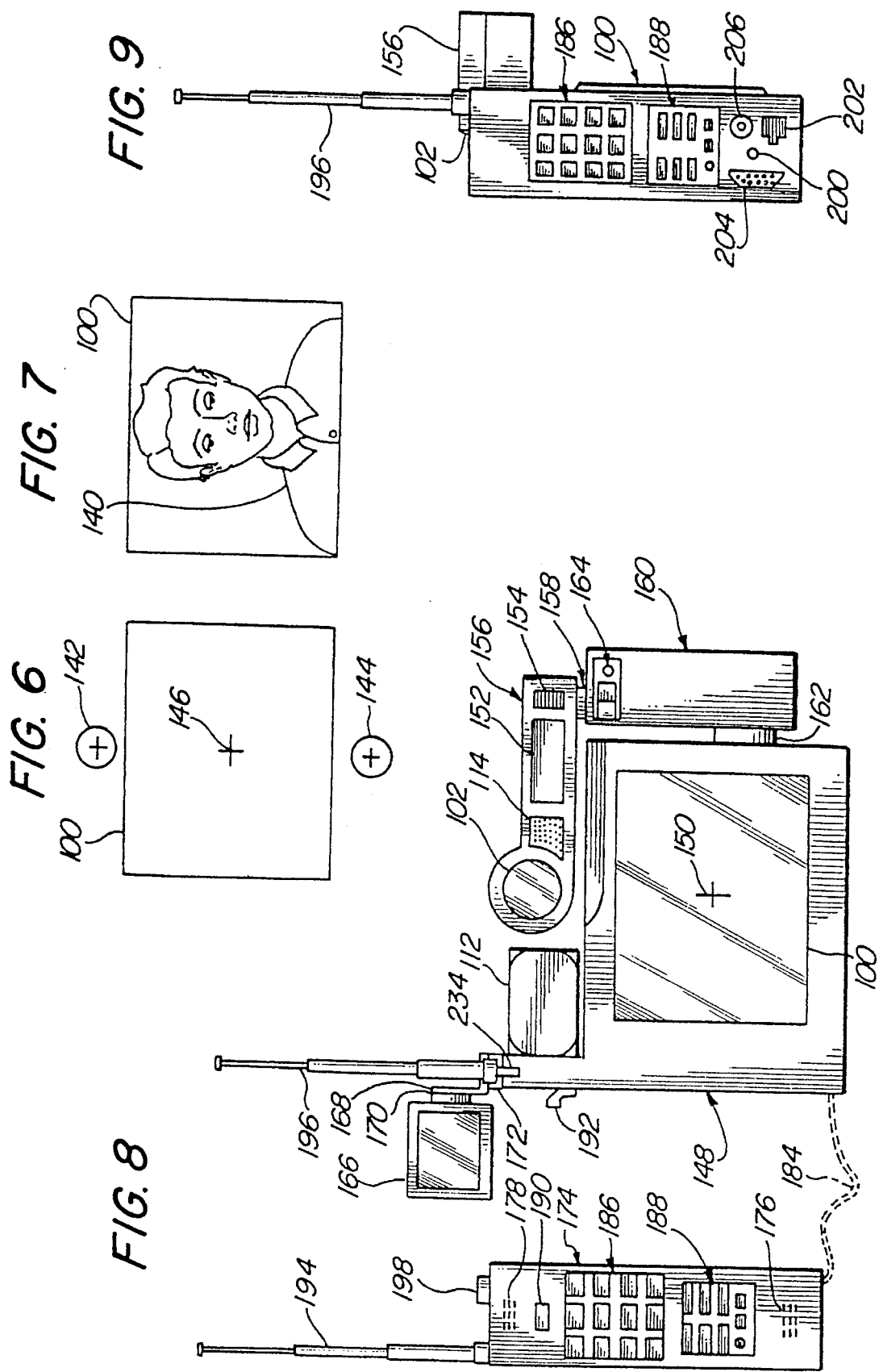

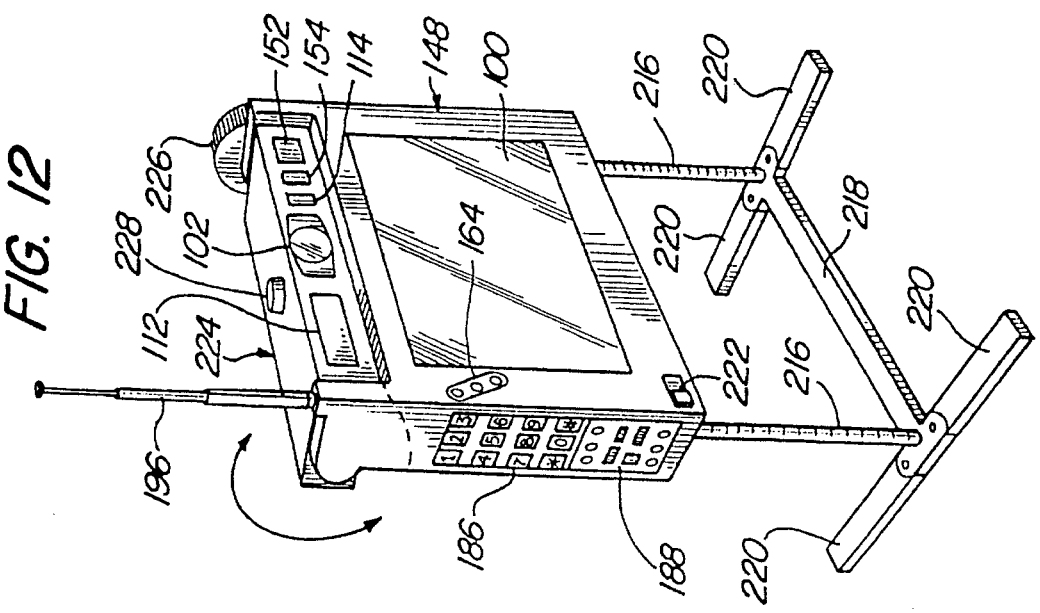
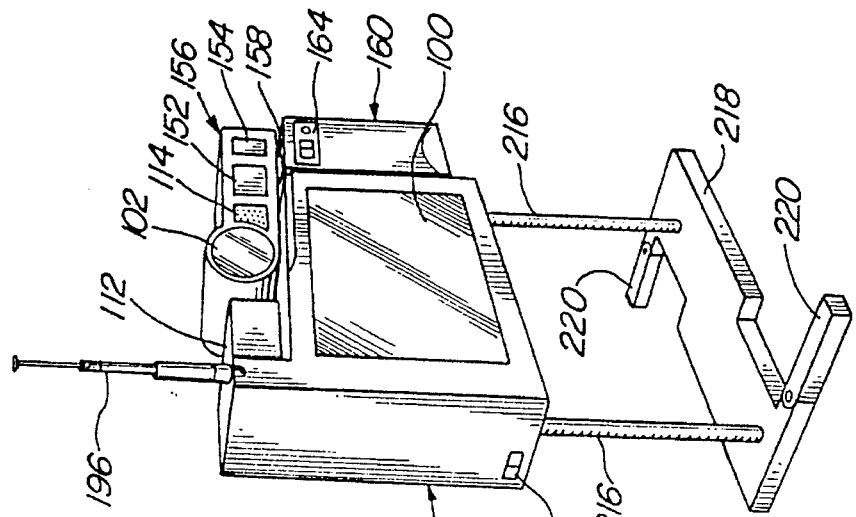
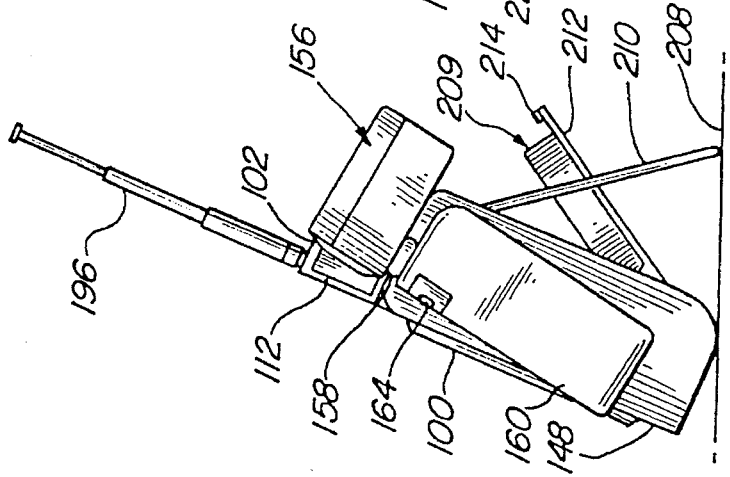

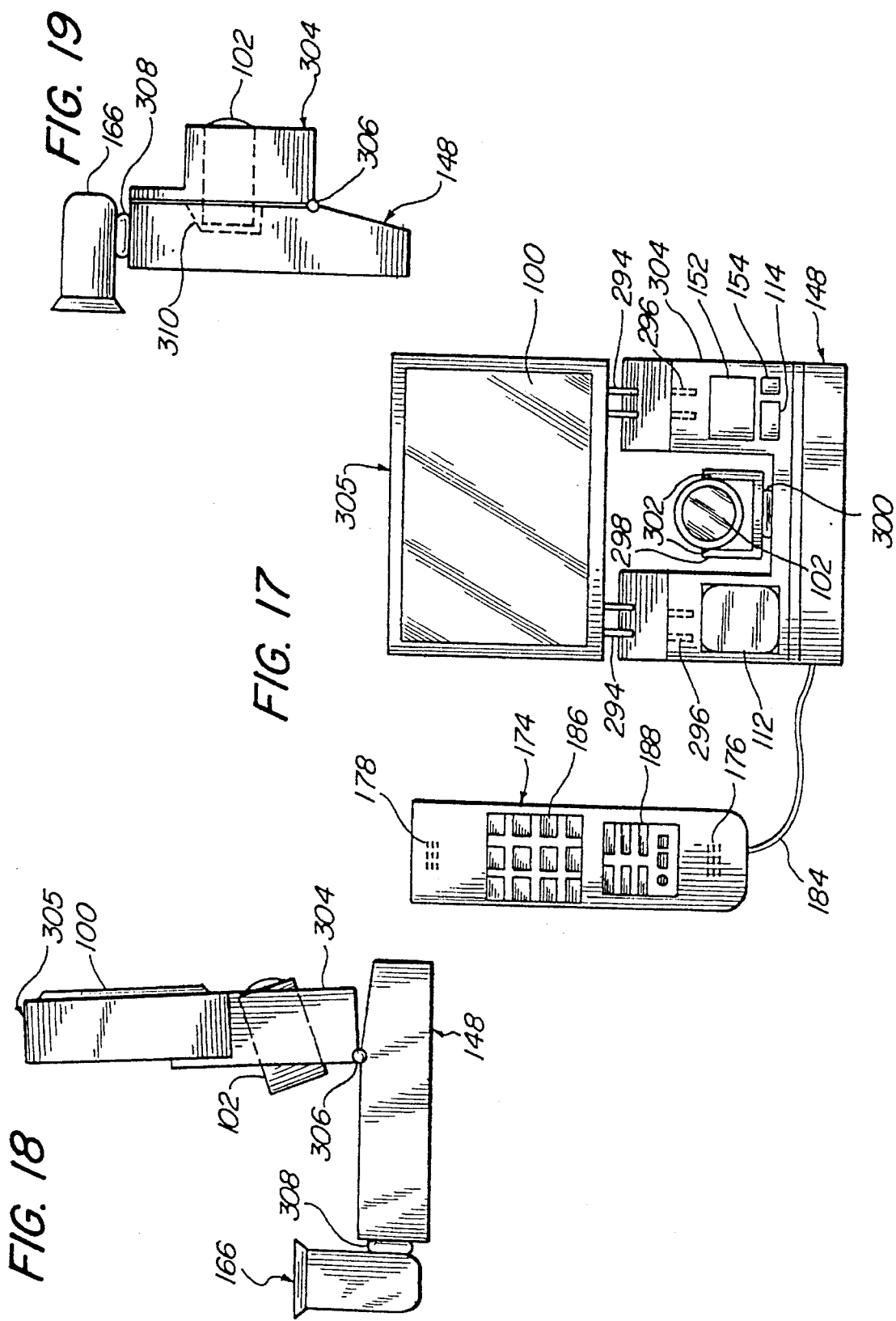

TELECONFERENCING CAMCORDER

BACKGROUND OF THE INVENTION

1. Field of the Invention

The present invention relates generally to video teleconferencing and, more specifically, to devices which make video teleconferencing less expensive and more convenient: namely, a specially-devised portable video recorder that can be used as a regular recording video camera and as a teleconferencing terminal and video answering machine.

2. Description of Related Art

The ordinary telephone is now over 100 years old. People have come to take for granted and to depend upon the ability to carry on, with ease, conversations with persons located halfway around the world. With the recent blossoming of cellular telephone service, the parties conversing do not have to be tied to any wire connections. Yet a persistent dream for over 50 years has been the ability to add a moving image to a telephone so that the conversation would include sight as well as sound. The terms "teleconferencing," "video teleconferencing," "video-conferencing," "video telephone", and "video-phone" all refer to a communication system that provides simultaneous sound and visual communication with a simplicity of operation similar to that of current telephones.

Much more business information could be readily transmitted if telephones were video as well as audio. Decisions could be made more rapidly and with more certainty if the parties could see and gauge each other's expressions. In terms of personal conversations, visual contact would allow more rapid and accurate communication of important emotions. Technological limitations of the present telephone and TV cable infrastructures have proven to be the primary stumbling blocks to achieving visual contact during a telephone conversation. That is, the technology to capture video as well as audio is well developed, but video signals have a large bandwidth which readily exceeds the capacity of present cables and other transmission systems. However, the completion of a fiberoptic infrastructure and the recent advances in signal compression should go a long way to overcoming these problems. In just a few years millions of people may be video conferencing.

However, fiberoptic cables and other transmission enhancements will not cause teleconferencing to appear overnight. Consumers will need specially designed teleconferencing hardware to take advantage of the new communication medium. Imagine the millions upon millions of telephones that will have to be replaced by video-telephone systems. This will result in considerable equipment expense for the consumer. The consumer might solve the problem by using video cameras contained in a housing with a speaker and microphone placed on top or near a television or computer monitor. Another, and possibly more costly, alternative is the use of special telephones that include a video display, video camera, microphone, and speaker.

One can expect a well-equipped video-phone user to have all the accoutrements of the present telephone user. Thus, an additional expense will doubtless be the video answering machine. A complete system may be so costly that many consumers may not have the resources to enjoy teleconferencing. Widespread acceptance of new types of consumer electronics is often very cost sensitive. For example, color television, video cassette tape recorders (VCRs), and home computers were on the market for a considerable period of time before the availability of inexpensive hardware made them popular. If economical teleconferencing hardware is available, the acceptance of that technology may be accelerated.

Although commonly-available hardware like the ubiquitous portable video camera/recorder (camcorder) has some of the attributes of a teleconferencing systems, current hardware has many drawbacks. The home camcorder can provide audio and visual pickup, but lacks simultaneous incoming and outgoing signal processing capabilities, phone ringing, dialing, and answering machine capabilities and, in most cases, has an inadequate image display to be useful in teleconferencing. The consumer will need to purchase additional components to even use a camcorder in a teleconferencing system.

Specialized video-phone hardware developed to date also fails to offer an economical solution. U.S. Pat. No. 5,046,079 to Hashimoto provides a special telephone answering device with a TV telephone. This unit can record an incoming picture as well as an incoming message. Like a standard answering machine, it also transmits a prerecorded message. This device can record an incoming video signal, but has no means for producing or transmitting a video signal in turn. U.S. Pat. No. 5,189,691 to Dunlap teaches the use of a dual deck VCR to act as a video telephone answering machine. Essentially, the unit is a dual VCR with telephone answering machine logic so that a video-phone line will be automatically answered, a prerecorded video message will be transmitted to the caller, and a video message from the caller will be recorded. There is no provision for facilities to produce the outgoing message.

OBJECTS AND SUMMARY OF THE INVENTION

It is an object of the present invention to provide a single unit that economically supplies the basic parts of a video telephone system;

It is another object of the present invention to also provide the functions of a portable video camera/ recorder or camcorder in the same unit; and It is a further object of the present invention to also provide a video-phone answering machine in the same unit.

Given the scope of the prior art, it is the object of this present invention to provide a device that is both a portable hand-held camcorder and is also a complete teleconferencing device that comprises audio and video-phone circuitry and audio and video answering capability. Economy is achieved by allowing components to be used for multiple purposes. The video camera is used for both camcorder purposes, i.e., on vacations, etc., and teleconferencing purposes, i.e., for recording video messages and for transmitting the user's image during a teleconference. An image display is used as a viewfinder so the user knows exactly what image the video camera is capturing, and also as a teleconferencing display to show the image of the distant caller during a teleconference. The speaker and microphone are also shared between camcorder and teleconferencing modes. The video and audio recorder and playback component is utilized for camcorder recording and for automatic video and audio answering capability.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 6 illustrates the preferred placement of camcorder camera in relation to a teleconferencing display;

FIG. 7 illustrates a preferred captured image of a conferee;

FIG. 8 illustrates a configuration of a complete telecamcorder terminal;

FIG. 9 illustrates a side view of the telecamcorder of FIG. 8;

FIG. 10 illustrates a side view of the telecamcorder of FIG. 8 when placed on a surface for teleconferencing;

FIG. 11 illustrates the telecamcorder of FIG. 8 that is raised to improve the image while captured while conferencing;

FIG. 12 illustrates a telecamcorder configuration where the camera is rotated by a knob;

FIG. 17 illustrates a telecamcorder that has a detachable teleconferencing display;

FIG. 18 illustrates a side view of the telecamcorder with a detachable teleconferencing display that is in teleconferencing mode;

FIG. 19 illustrates a side view of the telecamcorder in camcorder mode with the teleconferencing display detached;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a camcorder which can also act as a video telephone and as a video telephone answering machine.

Figure 1:
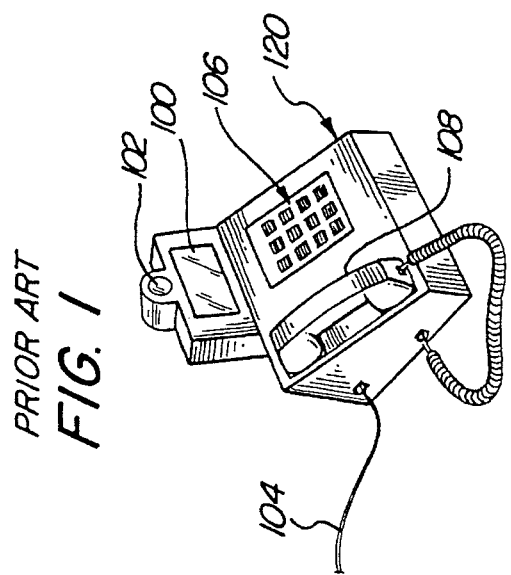
FIG. 1 illustrates a prior art video-phone.

A basic review of teleconferencing terminal configurations is helpful in understanding the present invention. The first and best known video-phone configuration is illustrated in FIG. 1. Here a phone unit 120 has a small video display 100 and a video camera 102. A phone line 104 carries both incoming and outgoing audio and video signals. A network access control (dial) 106 allows network access to any desired video-phone. A hand-held receiver 108 may be used or a speaker phone arrangement (not shown) may be used. Various adaptations and modifications of this basic configuration are well known in the art.

Figure 2:
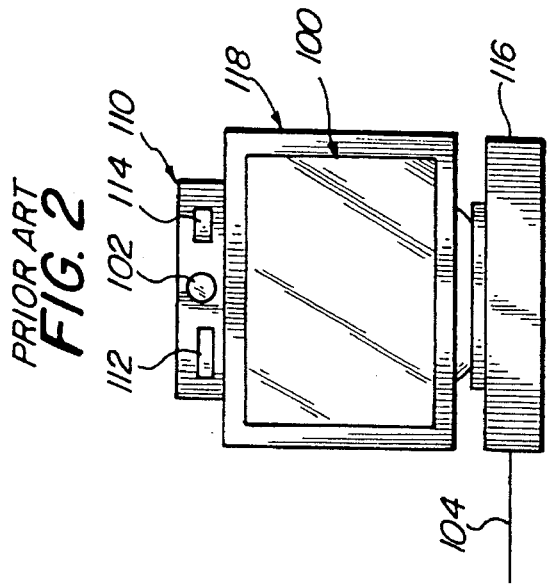
FIG. 2 illustrates a prior art computer teleconferencing system.

Recently personal computers with a GUI (graphical user's interface) such as MACINTOSH or WINDOWS have been used in rudimentary teleconferencing. The computer hardware and operating system compress and decompress video signals and display in a small "window" on the user's screen. FIG. 2 shows a GUI computer configured for teleconferencing. A video conferencing device 110 is placed above or built into a computer monitor 118 with a camera 102 placed above and on center with display 100. The device includes a speaker 112 and a microphone 114 that operate like a speaker phone. A computer 116 is connected to a phone network by the line 104 and also supports multitasking software which enables the display of a conferee on a monitor 118 during execution and display of various computer programs.

Figure 3:
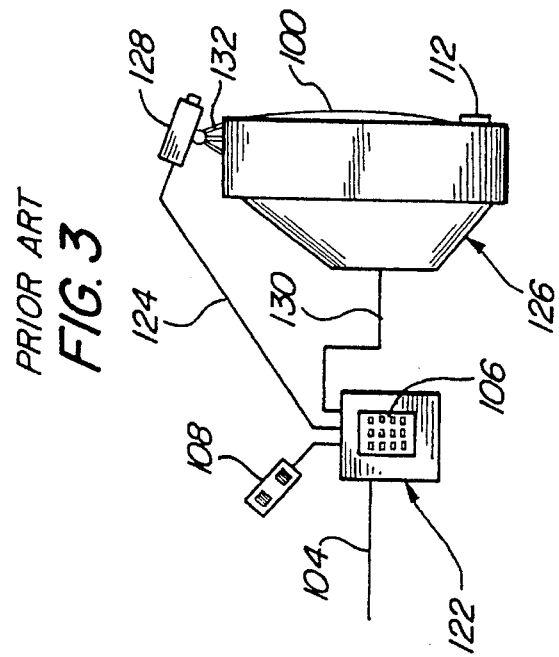
FIG. 3 illustrates a prior art teleconferencing arrangement.

A final basic teleconferencing configuration is illustrated in FIG. 3. Here a separate teleconferencing phone 122 with network access controls 106 is capable of receiving and sending signals through the phone line 104. A typical phone handset 108 may be employed or a speaker phone arrangement (not shown) may be used. The teleconferencing phone 122 is connected by a line 124 to a television monitor 126 for displaying the image of the distant conferee on a display 100. A speaker 112 of the television 126 may also be used for producing the audio portion of the teleconference. A video camera 128 connected to the phone 122 by a line 130 is placed on top of the television and captures the image of the local conferee. A tripod 132 or similar device may be used to position the camera.

The present invention uses a configuration of components fundamentally different from the configurations previously mentioned by restructuring a camcorder so that it may also serve as a complete teleconferencing system. A prior art camcorder consists primarily of an electronic camera, a recording and playback device, a microphone, a viewfinder, and a portable power supply all contained in a housing that can be held while in use. A camcorder (telecamcorder) of the present invention contains an integral video-phone capable of receiving and sending teleconferencing signals and includes a built-in display to view an incoming teleconferencing signal and a video pickup device that can produce an image of the operator for transmission during teleconferencing. The telecamcorder operates either as a conventional camcorder or a teleconferencing terminal allowing one single device to have multiple uses. Also, an audio and video answering machine is provided by utilizing the integral recording medium of the camcorder.

Quality teleconferencing requires restructuring of the camcorder's basic elements. The video camera component must be capable of capturing scenes like a typical camcorder, but must also be capable of capturing an image of the operator during teleconferences. Any camcorder can do this if the camcorder lens is turned towards the operator during teleconferencing. However, the current invention uses the display/viewfinder screen of the camcorder as the display screen of a video telephone. Thus, the device must allow the screen and camera to face in the same direction.

Figure 4:
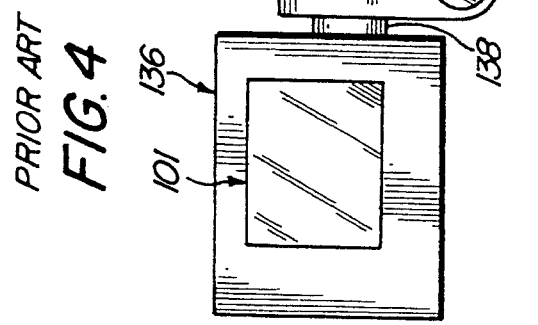
FIG. 4 illustrates a prior art camcorder configuration.

There currently are camcorders with viewfinder screens large enough to serve in teleconferencing. Furthermore, some of these devices have flexible camera mounts that can allow the camera to be pointed at the operator viewing the camcorder display. However, these devices, even if they were equipped with electronics for teleconferencing, would have serious limitations. As seen in FIG. 4, such a device has its camera 102 mounted on a handgrip 134 that is attached to the main housing 136 by a rotating pivot 138. The device can capture the image of the operator when the pivot 138 is turned toward the operator as is seen in the figure. The camera 102 is located below and to the right of the right vertical edge of the viewfinding display 101.

Figure 5:
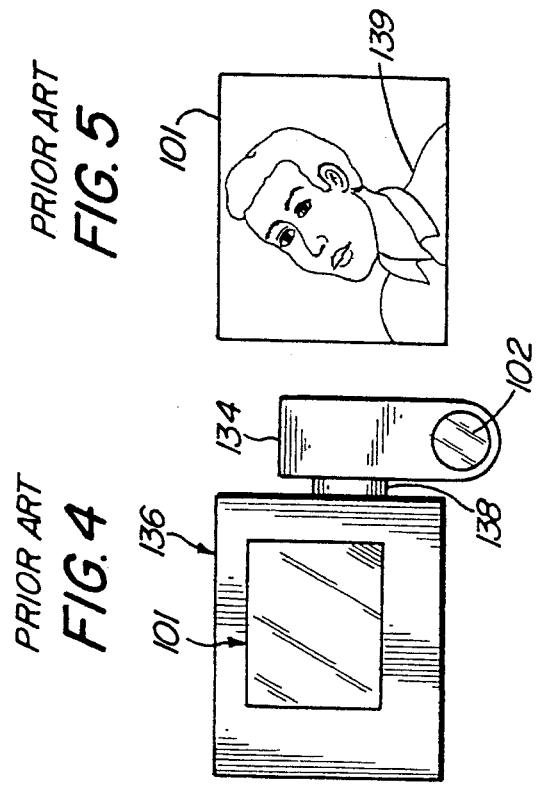
FIG. 5 illustrates a prior art distortion of a camcorder's operator who's image is being captured when viewing a viewfinding screen.

With such an arrangement a captured image of the operator will be distorted. FIG. 5 illustrates the image of the operator captured while looking at the viewfinding display. A camcorder operator 139 in the display 101 appears to be looking up and to the right and also appears to be facing in that direction, thereby exposing the operator's 139 left ear. This device, even if it were capable of teleconferencing, would provide extremely poor results because the distortion would hinder natural conversation. The conferees would appear to one another as disinterested; the lack of straight face-on viewing would frustrate comfortable conversation and thereby negate the intent of teleconferencing.

The telecamcorder of the present invention serves two distinct functions as a image/audio recording device and as a self-contained teleconferencing terminal. Unlike traditional camcorders where only one signal is processed, the telecamcorder, while in teleconferencing mode, simultaneously processes an outgoing audio/image signal and incoming audio/image signal. In the teleconferencing mode the device may also serve as an audio phone in the case where the distant caller has an audio-only phone or where either party chooses to suppress the images of incoming and/or outgoing video signals to ensure visual privacy. A telecamcorder as disclosed here also functions as a teleconferencing answering machine, and thereby eliminates the added cost of a separate answering machine.

In both the teleconferencing and camcorder modes the same camera optics are used and are designed to allow optimal performance in both modes. Features such as zoom and auto focus and numerous other special features common to camcorders may also be advantageously applied to teleconferencing. Numerous nonoptical camcorder features, such as video snapshots, time codes, and covers to protect the lens and display, may also be applied as desired to the camcorder configurations of this invention and adapted to teleconferencing when applicable. Or the display may be hinged to the main housing and fold down for protection, rather like the display of a notebook computer.

FIG. 6 illustrates the preferred placement of the camera. The camera is placed either above 142 or below 144 the horizontal perimeters of the display 100. The camera is positioned along a perpendicular axis that passes through a center 146 of the display 100. FIG. 7 illustrates the appearance of a conferee whose image is being captured by the camera in position 142 of FIG. 6. The appearance is improved over the appearance of the operator 139 in FIG. 5 because in FIG. 7 the conferee 140 faces straight ahead and not to the side in the display 100. This permits natural conversation in which people face each other while talking. Even with this improved conversational appearance the conferees cannot achieve eye contact because the camera is directed away from the eyes of the conferee who gazes toward the displayed image of the distant conferee and not toward the camera. This problem is a problem of parallax and frustrates all teleconferencing systems unless specific technologies are employed to overcome it.

When the camera in position 142 of FIG. 6 captures the image of the conferee, the conferee appears to be looking downward, as illustrated by the conferee 140 of FIG. 7. Likewise, when the camera in position 144 of FIG. 6 captures the image of the conferee, that conferee appears to be looking upward (not shown). Despite the lack of eye contact, mounting the camera above 142 or the camera below 144 the horizontal edges of the display and between the vertical edges, preferably along the center axis, does allow quality straight-on face-to-face conversation.

FIG. 8 shows a telecamcorder configured for use as a self-contained teleconferencing terminal as well as a camcorder. FIG. 8 illustrates the telecamcorder in teleconferencing mode where the camera 102 is pointed in the same direction as the viewing side of the display 100 which images the distant conferee from the incoming video telephone signal. The display may be of any type, but thin, lightweight displays, such as an active matrix LCD, are preferred. The camera 102 is placed above the display 100 along a center axis 150, permitting straight-on face-to-face conversation. The microphone 114, an optional light 152, and a remote sensor 154, along with the camera 102, are contained on a camera boom 156 that can rotate a full 360 degrees on a pivot 158. In camcorder mode, the camera boom 156 is turned 180 degrees, allowing the camera 102, the microphone 114, the light 152, and the sensor 154 to be directed toward the action to be videographed while using the display 100 as a camera viewfinder. The camera boom 156 may be pointed in any direction in either teleconferencing mode or camcorder mode, thus allowing recording of the operator's own image while in camcorder mode or capturing other images besides the local conferee for transmission to the distant conferee while in teleconferencing mode.

The camera boom 156 is connected to a rotating hand-grip 160 by a pivot 158. The hand-grip 160 is, in turn, connected to a main housing 148 by a pivot 162. The hand-grip 160 serves as a battery housing and also contains controls 164 for various features such as camera zoom and record/playback functions. The pivot 162 allows the hand-grip 160 to rotate vertically, and thereby positions camera boom 156 as well. As a result, camera boom 156 can be adjusted vertically by the pivot 162 and horizontally by the pivot 158. Such a positioning arrangement allows the camera 102 to provide a multitude of framing options and, particularly, allows control over the conferee's own image during teleconferencing.

The telecamcorder of FIG. 8 may also include a traditional single-eye viewfinder 166. A mounting bracket 168 attaches the viewfinder 166 and has two pivots allowing vertical 170 and horizontal 172 positioning of the viewfinder 166. The viewfinder 166 may be optical or may contain a small electronic display that displays the image captured by the camera 102. The single-eye viewfinder 166 causes less battery drain than the larger teleconferencing display 100, an important factor in situations where long battery life is a necessity. Also, the single-eye viewfinder 166 allows the camcorder operator to more effectively track moving objects. The telecamcorder may be configured without the single-eye viewfinder 166 and then utilizes one display 100 as both teleconferencing display and viewfinder. The single-eye viewfinder 166 may also simply be a second video display which is viewed with one eye or both eyes and is substantially smaller than the display 100 used for teleconferencing. If the viewfinder, as well as the display screen, is provided by an electronic display, either the display screen or the viewfinder may be configured for use in both the camcorder mode and the teleconferencing mode.

The microphone 114 of FIG. 8 serves as audio pick-up for both camcorder mode and teleconferencing mode. The microphone 114 can be repositioned to face in the same direction or in the opposite direction as the display 100. The speaker 112 is provided for reproducing an audio signal from the distant conferee while in teleconferencing mode or for reproducing audio during playback of recorded material. In teleconferencing mode the speaker 112 and the microphone 114 serve as a speaker phone. Additional speakers and microphones may be added as desired, either within the main housing 148 or as external speakers and microphones. Speaker volume and microphone sensitivity may be controlled by automatic circuits or manual controls may be provided. Controls for suppression of either speaker and/or microphone may also be included.

A separate handset unit 174 that includes a microphone 176 and a speaker 178 may serve in addition to or in lieu of the previously-mentioned built-in speaker phone. The handset 174 functions similarly to a traditional phone receiver and can be directly connected to the main housing by a line 184 by means of common phone jacks (not shown). Alternatively, the microphone 176 and the speaker 178 may be mounted on a headset (not shown). Microphone 176 and speaker 178 may additionally serve as a remote speaker phone that includes sensitivity controls for either hand-held use close to the ear and mouth, or for speaker phone use placed near the conferee.

When handset 174 is used as a remote speaker phone, the speaker 178 may be suppressed and the speaker 112 of the telecamcorder or another speaker near the display 100 may be substituted to create the impression that audio is coming from the direction of the distant conferee whose image is being displayed. In that case, the microphone 176 serves as a speaker phone microphone and the handset 174 is placed near the local conferee. The handset 74 also contains network access controls 186, telecamcorder controls 188, and a latch 190 which mates with latch 92 on the main housing 148. Cordless phone technology can be employed in place of the line 184 and is the preferred configuration when the telecamcorder is used with an auxiliary monitor, such as a television, and the conferee is several feet away from the telecamcorder.

The handset 174 transmits and receives cordless phone signals through an integral antenna 194 and a main housing antenna 196. The telecamcorder controls 188 may be linked to the main housing 148 by infrared signals using a sensor 198 on the handset 174 and a sensor 156 on the main housing 148. Cordless phone technology need not be limited to a hand-held unit, but may be included on a headset or other common arrangement. The telecamcorder controls 188 can also utilize cordless phone technology (not shown), and thereby eliminate the need for infrared or similar remote control means.

FIG. 9 shows a left side view of the telecamcorder illustrated in FIG. 8. This figure shows the dialing controls 186 and the telecamcorder controls 188 built into the main housing 148. Built-in controls may serve in lieu of controls on the handset 174, or both sets of controls may be employed on a single telecamcorder. Electronic connectors are illustrated, including a low voltage connection 200, an incoming/outgoing phone connection 202, an RGB-out connection 204, and a television-out connection 206.

FIG. 10 illustrates a right side view of the telecamcorder of FIG. 8. Here the main housing 148 is positioned on a table top or flat surface 208 and angled backwards by positioning arm 210. The arm 210 moves away from the unit so the main housing 148 can lean backward, toward the horizontal, pointing the display 100 upwards. Likewise, when the positioning arm 210 is moved toward the main housing 148, angle of the display 100 moves toward the vertical. When the positioning arm 210 is closed into the back of the main housing 148, the telecamcorder is able to stand by itself with the display 100 in a vertical position.

The various positioning angles of the display 100 permits comfortable viewing of the display 100 during teleconferencing. The hand grip 160 can be slightly tilted backward by means of the pivot 162 that connects it to the main housing. This enables the camera 102 to be adjusted in the vertical direction to produce a desired framing of the local conferee. Also, adjustments of the aiming direction can be made in a horizontal direction by the pivot 158. A removable recording medium 209 is placed into the telecamcorder through a door 212 which is released by a latch 214 and then closed for recording.

FIG. 11 shows an alternative design for using the telecamcorder placed on the surface of a desk or table. The embodiment explained above leans backwards when placed on a surface. This may introduce additional distortion into the image of the local conferee or of the surroundings. One method of avoiding this problem is to include means to elevate the telecamcorder to approximate eye level of the local conferee. In this way the camera 102 is directed straight at the conferee rather than at an angle. Elevation can be achieved by providing a separate stand that is attached to the telecamcorder or, as in FIG. 11, a self-contained means of elevation can be used. In the figure, two extension rods 216 are designed to telescope into the main housing 148 when not in use. Attached to the rods 216 is a flat resting plate 218 that closes up onto the bottom of the main housing 148 when the rods 216 are not extended. Additional foldout legs 220 are hingedly attached to the plate 218 and provide extra stability. A latch 222 is provided on the main housing 148 to lock the rods 216 at any desired height. Other means of providing built-in elevation will be apparent to those of ordinary skill in the art and may be applied to all of the disclosed embodiments.

FIG. 12 shows a preferred embodiment where the camera 102, the microphone 114, the light 152, and the sensor 154 are not located on the camera boom 156 but, instead, are located on a revolvably-mounted positioning piece 224. The positioning piece 224 is pivotally mounted by its ends and is capable of rotating at least 180 degrees. A rotation handle 226 is provided to flip the positioning piece 224 from one position (primarily used in the teleconferencing mode) in which the camera 102 faces the same direction as the display 100 to a second position (primarily used in the camcorder mode) where the camera 102 faces away from the display screen. Electronic connections (not shown) for the various components of the positioning piece 224 are fed through hollow centers of pivots used to permit flipping of the positioning piece 224. Repositioning motion is limited to about 220 degrees so that the connections will not become twisted or strained.

To make "flipping" of the camera 102 work effectively, the image must be electronically inverted when the camera 102 is flipped, otherwise either the camcorder image or the teleconferencing image will appear upside-down. Circuits to accomplish this type of inversion are well known. Although a switch on the main housing 148 may be provided to control this feature, the preferred system included a gravity sensing switch in the positioning piece 224, so that the image is automatically inverted whenever the camera 102 is flipped. A knob 228 permits horizontal positioning to allow image framing for teleconferencing. FIG. 12 also shows raising means similar to that of FIG. 11, except that two additional foldout legs 220 are provided for greater stability.

Figure 13:
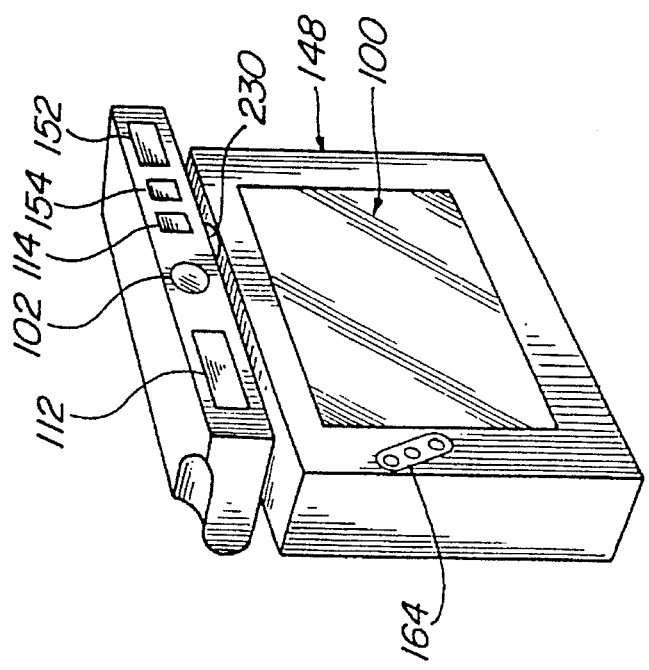
FIG. 13 illustrates a telecamcorder configuration where the camera is rotated by a spinning turret.

An additional simplified embodiment is shown in FIG. 13. Rather than having the camera 102 placed on the positioning piece 224 or the camera boom 156, the camera 102 is equipped with a rotating pivot 230 of its own. This allows the camera 102 to rotate turret-like from one side to an opposite side of the main housing 148. Again, the rotation is limited to avoid tangling internal connections. The rotation achieves the same effect as the camera boom 156 or the positioning piece 224; however, the other components, such as the microphone 114 and the light 152, need not be automatically repositioned at the same time. Depending on the degree of complexity and expense that is tolerable, some or all of these components can be equipped with their own individual pivots or they can be duplicated on both surfaces of the main housing 148.

Perhaps the simplest solution is to dispense with the light 152 and have the microphone 114 share the same pivot 230 as the camera 102. The camera 102 can also be provided with a second pivot (not shown) to permit limited movement in a vertical direction, so that framing can be more readily achieved. Other configurations, such as mounting the camera on a flexible tubing or simply detaching and reattaching the camera to different mounting positions, will be apparent to one of ordinary skill in the art.

Figure 14:
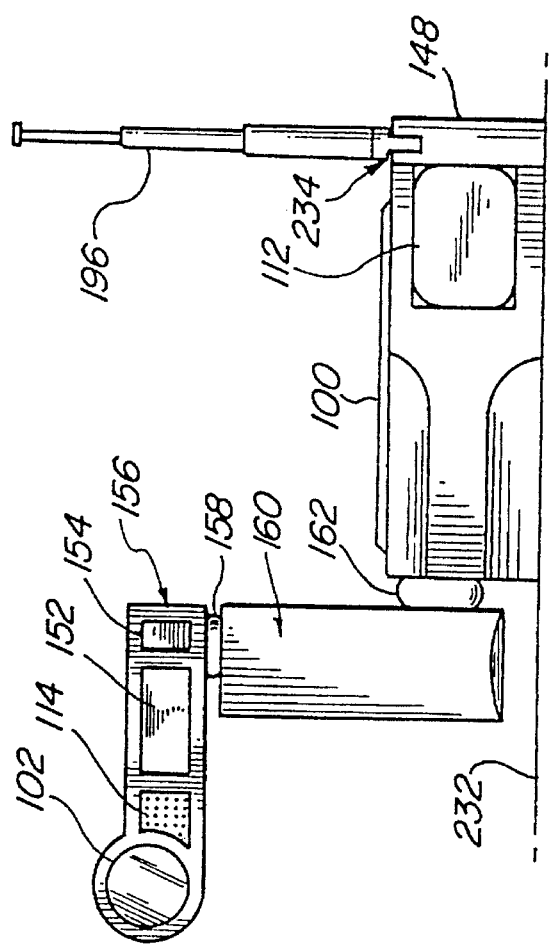
FIG. 14 illustrates the telecamcorder of FIG. 8 when placed above or below an external monitor.

Sometimes it is advantageous to employ a larger display screen than that provided on the telecamcorder. Perhaps a group of people are teleconferencing: the camera must necessarily be farther away to include all the individuals; therefore, the normal display screen will be too small. For such instances an auxiliary large display can be connected to the television-out connector 206. FIG. 14 illustrates the telecamcorder of FIG. 8 when used with an external display device, such as a computer monitor or television. Unlike the prior art arrangement (see FIG. 3), separate image/audio receiving and sending signal device is not necessary because the telecamcorder contains all necessary circuits for teleconferencing. Also, unlike FIG. 3, a tripod or similar stand is not needed because the telecamcorder camera contained in the camera boom 156 allows adjustment of the camera 102 vertically by means of the pivot 162 and horizontally by means of the pivot 158. The main housing 148 rests on a surface 232 which may be a desk top with the display above the telecamcorder, or may be the top of a computer monitor or television. The speaker 112 has been repositioned away from the viewing side of the display 100, so that it may serve as the teleconferencing speaker for the external display, which may be a computer monitor that rarely has an integral speaker. The cordless phone antenna 196 also is repositioned by a swivel connection 234 so that it stands upward when the main housing 148 is laid flat. The swivel connection 234 can be seen in a different position in FIG. 8. The camera boom 156 which is connected to the hand grip 160 by the pivot 158 also directs the microphone 114, the light 152, and the remote sensor 154 toward the conferee who is viewing the distant conferee displayed on the external display monitor.

The telecamcorder of FIG. 8 has several common ways of operation while in camcorder mode. In one mode, the operator holds the entire unit in front of him/her with the display 100, serving as the viewfinder. The hand grip 160 is turned to aim the camera 102 in a desired direction. In another mode, the operator holds the unit to the his/her eye and looks through the viewfinder 166. In a third mode, the main housing 148 rests on the operator's shoulder with camera boom 156 positioned, so that camera 102 is aimed in the direction the operator faces. The viewfinder 166 is positioned so the operator can look into it. Comfort features, such as a hand strap and a shoulder rest, are well known in the art and can easily be applied to the present invention.

Figure 15:
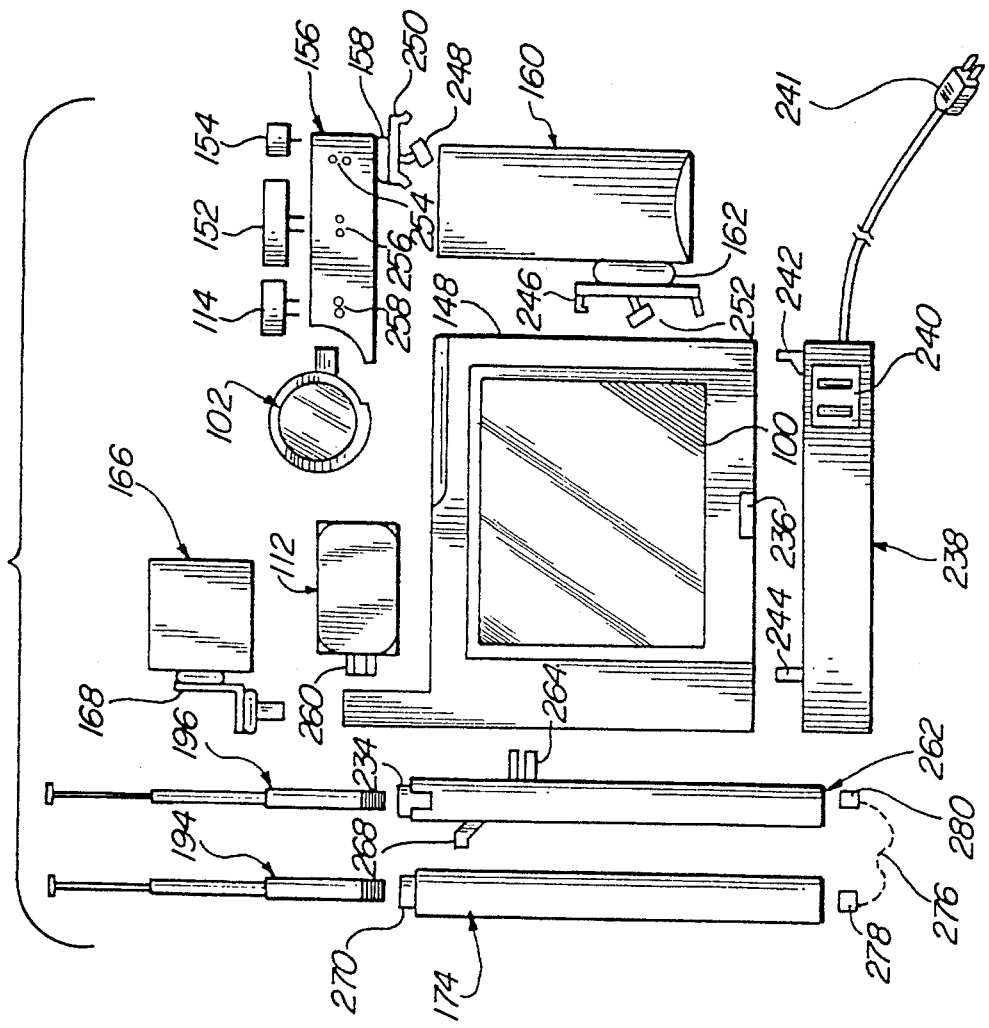
FIG. 15 illustrates a telecamcorder that is modular.

FIG. 15 illustrates modularity of components of the telecamcorder of the present invention which allows easy repair, ready exchange of parts, operation with fewer components for compactness and reduction of weight and remote operational modularity by disconnecting desired components from the main housing, but leaving them connected by cables (not shown). Specific latches and connections are meant to illustrate only the basic principle of modularity. The display 100 can be released from the main housing 148 by a latch 236. A transformer 238 receives electrical power through a plug 241 and has an optional auxiliary power receptacle 240. The transformer 238 can be released from the main housing 148 by a latch 242 and remain electrically connected to the main housing 148 through a connector 244. The hand grip 160 connects to the main housing 148 by means of a latch 246 that is, in turn, connected to the pivot 162. An electronic connector 248 connects the handgrip 160 and the camera boom 156 to the main housing 148. A latch 250 connected to the pivot 158 and connected to the camera boom 156 may be attached and detached from the hand grip 160. An electronic connection 252 connects to the handgrip 160 which, in turn, connects to the main housing 148. The camera boom 156 has a connector port 254 for the sensor 154, a connector port 256 for the light 152, a connector port 258 for the microphone 114, as well as a connector port for the camera 102 (not shown). The lens may be detached from camera 102 by connector similar to one commonly used for film cameras (not shown). The viewfinder 166 is connected to a pivot mount 168 which is attached to the main housing 148. The speaker 112 connects to the main housing 148 by a connection 260 which permits upward rotation of the speaker 112. A phone base 262, which may include cordless electronics, connects to the main housing 148 by connection 264. The phone base 262 contains an antenna connection 234 which permits the antenna 196 to be disconnected. The handset 174 detaches from the phone base 262 by a latch 268. The antenna 194 of the handset 174 detaches by means of a connector 270. A phone cord 276 detaches from the handset 174 by connector 278 and from the phone base 262 by a connector 280.

Figure 16:
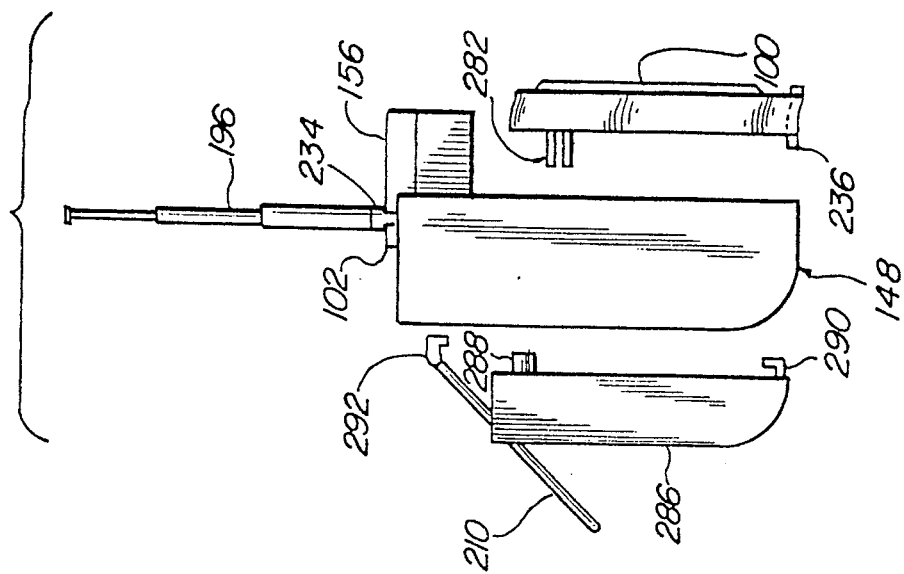
FIG. 16 illustrates a side view of a telecamcorder that is modular.

FIG. 16 shows a left side view of the modular telecamcorder illustrated in FIG. 15. The display 100 faces away from the main housing 148 and is connected to the main housing 148 by a connector 282 and released from the main housing 148 by a latch 236. The recording device 286 connects to the main housing 148 through a connector 288 and is released from the main housing 148 by a latch 290. The positioning arm 210 attaches to the main unit 148 by a latch 292. Also, means of raising the telecamcorder or a portion of the telecamcorder for teleconferencing may be detached and reattached to the main housing 148 (not shown).

The recording and playback device inherent in a camcorder is used in the telecamcorder to accommodate various recording and playback features useful to teleconferencing. A traditional camcorder records video signals captured by the video camera while simultaneously recording audio signals picked up by the microphone. The playback functions included in the telecamcorder utilize the teleconferencing display and/or the viewfinder for displaying images and the built-in speaker or the handset speaker for audio production. In teleconferencing mode, the recorder may record the outgoing signal or the incoming signal from the distant conferee. Also, the recorder may record or play back a separate signal while the audio and video-phone is in use. Both incoming and outgoing signals may be recorded simultaneously by mixing audio signals and screen splitting or having a picture in a picture, so that the recorded signal will contain both images. Technologies for screen splitting and picture-in-picture are commonly employed in teleconferencing systems for self-viewing. Self-viewing during teleconferencing also can be accomplished by suppressing the display of the incoming signal and displaying the outgoing signal instead.

Screen splitting and picture-in-picture and audio mixing are also commonly used for multiple conferee teleconferencing. The telecamcorder may be equipped to allow multiple input lines which allows the local conferee to see and hear many distant conferees at the same time. Modifications for multiple line and multiple conferee teleconferencing will be apparent to those skilled in the art. The integral recording device of the telecamcorder also allows the opportunity to record multiple conferees simultaneously, including the local conferee, or selected conferees from a group. Recording in any situation may be selected for audio-only or image-only. Likewise, playback may be selected for audio-only or image-only.

The present invention, in addition to providing a camcorder designed for use as a teleconferencing terminal, also operates as an audio and video answering machine. For distant terminals which are audio-only, the image portion of the answering machine message can be suppressed, so that the unit operates similarly to a conventional telephone answering machine. Camcorders most often record analog audio and video signals on magnetic tape. An answering machine requires two distinct recording memory sections. One section is used for playback of a recorded greeting and the other section is used for the recording of the incoming messages.

One video-phone answering machine configuration for the telecamcorder uses a single tape recorder that has a predesignated section of tape for recording an outgoing message and another section of tape for recording incoming messages. For the unit to broadcast the outgoing message and then record the incoming message, the tape must be automatically wound and rewound to these exact sections. This feat is achieved by detecting special signals recorded on the tape, as is well known in the art of answering machines. A single tape configuration is somewhat inflexible because the outgoing message is usually of limited duration. If the message takes too long in rewinding, part of the incoming message may be missed. However, there are also advantages to such a system. Because only one tape deck is needed, the cost and complexity of the telecamcorder is reduced.

A second configuration for the camcorder-answering machine uses two recording sections, with each section containing its own recording memory device. Typically, this comprises dual tape decks where one deck plays the prerecorded outgoing message and the second deck records the incoming message. In this configuration the telecamcorder would have two recording devices, either of which could be used for recording in the camcorder mode. This configuration may pose certain advantages for the camcorder mode: dual recording devices allow for twice the duration of recording; and dual decks allow fancy editing and dubbing of recorded video. In the answering machine mode, the dual tape system allows great flexibility in the length of the outgoing message and permits an incoming message to be recorded simultaneously with the playing of the outgoing message.

The disadvantage of a dual recording tape system is the added size and weight of the telecamcorder, as well as the increased cost of manufacture. Size may be reduced by replacing the greeting tape deck with a solid state device capable of recording and playing back a relatively short greeting whose signal contains both audio and images. However, with current technology this would probably limit the length of the outgoing message and increase the cost of the unit. As high-capacity solid state storage devices become more economical, two solid state devices can be employed, such as is presently done on many audio-only answering machines.

Although most current camcorders use analog recording techniques, digital recording can be advantageously employed in the telecamcorder for both recording modes and for answering machine function. Generally, digital telecamcorders operate with the same "one tape, two tape" configurations as their analog counterparts. A digital recording telecamcorder answering machine can also have two distinct storage devices in the telecamcorder housing: one for outgoing messages, and the other for incoming messages. Again, one or both of these storage devices can be used in either the camcorder mode or the other recording modes. A single storage device that has distinct sections for greeting and incoming messages is a preferable configuration because it requires fewer digital recording devices.

A significant advantage to digital recording is the ease with which digital recording devices, such as magnetic hard disks, floppy disks, floptical disks, cartridge drives, digital tape, CD-ROM, and holographic storage systems may be employed. A holographic storage device is manufactured by Tamarack Storage Devices, and this or similar technology promises to be the most advantageous of all the digital storage mediums because of the low power consumption, removability, small physical size, large storage capacity and data access speeds similar to that of a conventional hard drive. Because the various disk-type digital recording devices have short access times, it is possible to use a single recording device to simultaneously play an outgoing message while recording an incoming message. Frames of either message can be briefly held in a frame buffer while the disk reads or writes the next frame.

An additional reason to opt for digital recording is that data compression techniques, as will probably be required to maximize the carrying capacity of cables or fiberoptic links, require data in a digital form. Instead of the expense and quality loss due to repeated digital-to-analog and analog-to-digital conversions, it is advantageous to start digital and stay digital all the way. To this end, digital video cameras employ circuit boards that include a charge coupled device (CCD) optical pickup. As electrical values are read from the CCD, the values are immediately converted into digital values and remain digital through all subsequent processing.

The telecamcorder answering machine accesses the shared recording medium of the camcorder when activated by an incoming video-phone signal. As with the current generation of telephone answering machines, the unit can be set to "pick up the line" (answer the phone) after a preset number of rings or at the conclusion of a predetermined interval following the start of the incoming signal. When the unit "picks up" in response to the incoming signal, the first memory section plays back the prerecorded message and the unit transmits the message to the calling terminal. The video signal can be suppressed so that the outgoing message will be audio only to ensure compatibility with conventional phones, should both conventional and video-phones share the same network. The local conferee can maintain anonymity by simultaneously viewing both the outgoing message and the incoming message without interrupting the answering machine function. Upon the completion of the outgoing message, the second memory section is engaged to receive the incoming messages.

Of course, if dual recording devices are provided, it is possible to play the outgoing message while simultaneously recording the incoming signal. The outgoing recorded message can be transmitted to the distant terminal, while at the same time the distant conferee records a message on the second memory device of the local telecamcorder terminal. An additional benefit of transmitting the prerecorded message of the local conferee while a message is being received is that the prerecorded message can warn the distant conferee of any constraints on incoming message length.

A single recording/memory device will generally not allow simultaneous recording of the incoming message while the outgoing message is being played. Of course, the length of the incoming message may be set to a fixed time period or may be without time limitation. Once the allotted time period is over, the incoming message will no longer be recorded. At this time the unit may hang up or a special goodbye message may first be transmitted before the connection is broken.

Other answering machine features may be easily adapted to the telecamcorder by those skilled in the art. Multiple greetings may be accessed through a menu system with multiple message "boxes" designated for receiving incoming messages. Access codes may be used to provide privacy for multiple users with each user having their own box. A digital storage device with fast retrieval times is needed for such a system. Also, an audio/video memo feature can allow one to leave a message memo at the telecamcorder. Another feature that would be readily adaptable is an auto-dial function that would play a recorded message automatically to one or more distant terminals.

As with standard audio answering machines, the telecamcorder answering machine may be remotely accessed to review the recorded messages or to record a new outgoing message. This remote contact can be made from a video-phone or from a conventional phone in which case only audio can be reviewed or recorded. Various schemes involving access codes can be employed to prevent access by unauthorized persons.

The present invention may also be configured as a camcorder answering machine for use with another separate teleconferencing terminal. In this case, the telecamcorder need not necessarily provide dialing controls or teleconferencing speaker and microphone because these items are provided by the separate terminal. The phone line in this arrangement connects directly to the telecamcorder where it is connected to a ringing identification circuit. The separate teleconferencing terminal is connected to a jack on the telecamcorder. When the telecamcorder picks up the line at the selected point in the ringing cycle, the answering cycle commences as has been previously described. If the teleconferencing terminal is operating, the incoming transmission can be viewed while the caller at the other terminal sees only the prerecorded outgoing message.

In the near future, video-phone networks will use one or a combination of phone lines, television cables and wireless networks (i.e., cellular phone systems). The telecamcorder is applicable to any type of network. The telecamcorder is also applicable to numerous interactive and multimedia applications carried over these networks; however, such uses may require special controls and hardware to be built into the telecamcorder. Signal convertors can easily be added as needed to ensure compatibility with different networks and transmission technologies. Frame rate or shutter speed requirements for these networks may vary from the format used by most camcorders and, thus, make it necessary for the telecamcorder to operate on more than one standard. With a wireless network the telecamcorder can serve as a portable wireless teleconferencing terminal much like a portable cellular phone. The cordless phone antenna 194 of FIG. 8 can readily serve as the antenna for a wireless telecamcorder or an additional antenna (not shown) can be used. An individual telecamcorder can serve both as a wireless terminal or, when connected to a cable or phone wire, as a conventional "hardwired" terminal on the video-phone network.

The telecamcorder can be further enhanced by making the display detachable. Because a large display increases the size and weight of the unit, the teleconferencing display may be detached in the camcorder mode. This enables a consumer to purchase a less expensive "starter" telecamcorder with only a small display. Later, the consumer can upgrade the unit by attaching a mount to the main housing 148 for holding a larger display, which is then plugged into a standard external display (see FIG. 9, 204 or 206). FIG. 17 illustrates a telecamcorder with a detachable teleconferencing display 100. The display 100 attaches and detaches from the main housing 148 by a connector 294 and a receiving port 296. The main housing 148 includes the speaker 112, the microphone 114, the remote sensor 154, the light 152, and the camera 102. The camera 102 is mounted on a pivoting system 298 for image framing while in teleconferencing mode. The system 298 consists of a pivot 300 for horizontal aiming of the camera 102 and a small pivot 302 on either side of the camera 102 for adjustments in the vertical direction. Like the previous embodiments, this unit may be used as a speaker phone with the built speaker 112 and the microphone 114 or the phone handset 174 may be used. The handset 174 contains the microphone 176, the speaker 178, the telecamcorder controls 188, and the dialing controls 186.

FIG. 18 shows a side view of the embodiment of FIG. 17 in which the telecamcorder is in the teleconferencing mode. Here the display 100 is attached to a hinged section 304 which is attached to the main housing 148 by a hinge 306. The hinge 306 allows the display 100 to be positioned at any desired angle. The camera 102 is attached to the hinged section 304, which also contains the speaker 112, the light 152, the remote sensor 154, and the microphone 114 (all not shown). The main housing 148 contains the recording medium 209, electronic circuitry, and batteries (all not shown). The viewfinder 166, which is used in the camcorder mode when the main display is detached, is attached to the main housing 148 by a pivot 308, allowing it to be positioned in a full range of directions.

FIG. 19 shows a side view of the embodiment of FIG. 17 in the camcorder mode. Here the display 100 has been completely removed in its own housing. The hinge 306 has been used to move the hinged section 304 all the way back to the main housing 148. The camera 102 is positioned within a section 310 of the main housing 148. The viewfinder 166 is trained in a desired direction by the pivot 308.

As already explained, a significant challenge in teleconferencing is creating eye contact between the conferees. One method of achieving eye contact is to place the camera directly in the conferee's line of sight, so that the conferee looks directly into the camera lens. The problem is hat the conferee naturally looks directly at the face of the other conferee imaged on the terminal's display. That is to say, the camera and the display must occupy the same location in space. This problem can be solved by optically achieving an image that permits eye contact or by electronically correcting an imperfect image. Optical methods work by either placing the camera behind the display screen and providing a means that the camera can "see" through the screen, or by using special optical systems (i.e., semisilvered mirrors, rear projection systems, transparent liquid crystal displays) that allows the camera to seemingly capture an image through the screen. Electronic correction uses computers and software to correct critical portions of the image to give the semblance of an image produced by one of the optical methods.

An uncomplicated method of optically producing an eye contact image employs a partially silvered mirror mounted at a 45-degree angle in front of the display screen. The conferee looking at the display is able to see the image through the mirror, although the partially opaque nature of the mirror causes some loss in brightness. At the same time, the video camera is mounted below the mirror pointing upward, so that its line of sight also forms a 45-degree angle with the mirror. The image of the conferee is reflected down into the camera, so that while the conferee gazes straight into the image of the display, the conferee also gazes straight into the camera, thus producing a perfect eye contact image. The drawback to this relatively simple technology is that the partially-silvered mirror adds bulk and weight to the teleconferencing unit-a definite problem for a portable telecamcorder.

Figure 20:
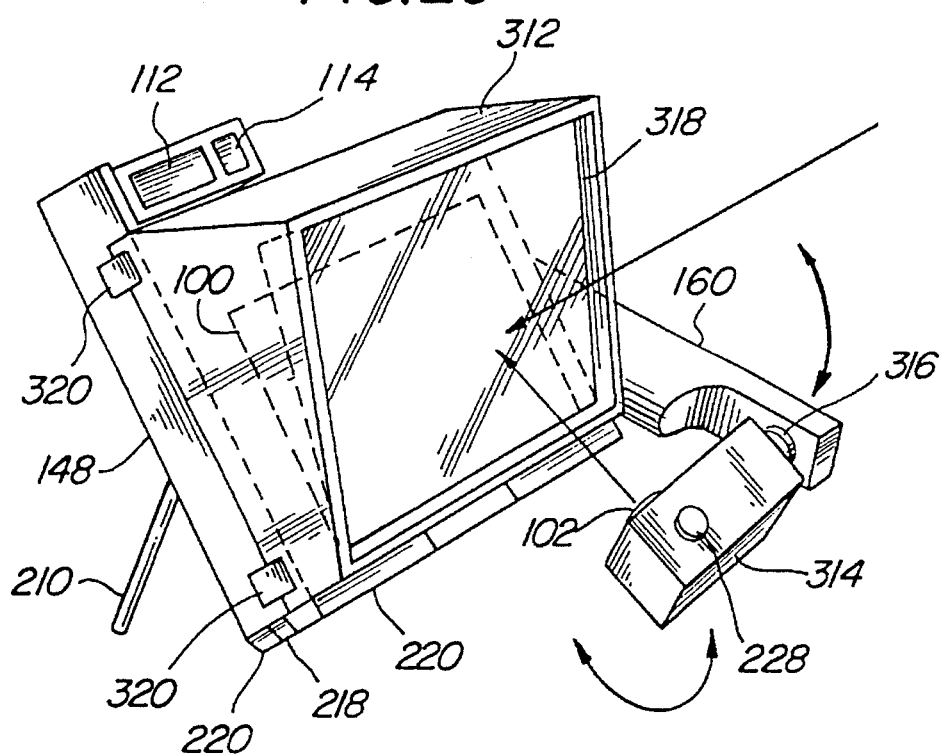
FIG. 20 illustrates a telecamcorder with a partially-silvered mirror enabling eye contact.

Various combinations of polarizers and additional mirrors may reduce the angle and thereby reduce bulk. These technologies may be readily adapted to the following telecamcorder configuration. FIG. 20 shows the present invention adapted to use a semisilvered mirror. This telecamcorder is very similar to the unit with the camera boom and hand grip shown in FIG. 8. Here a hood-like mirror unit 312 is attached by snaps 320 over the display 100. A revolving camera boom 314 is connected to handgrip 160 by pivot 316, which allows the revolving camera boom 314 to be rotated to a proper position to capture the conferee's image (not shown) reflected by a partially-silvered mirror 318 that forms part of the hood unit 312. Normally, while in use as a camcorder, the hood unit 312 is stored at home because it is somewhat bulky. Of course, the hood may also be built as a part of the telecamcorder and not removable. Or without a hood, the partially-silvered mirror 318 may be angled, all by itself, out from the display and may be built in by a hinge and folded up toward the display when not in use (not shown), or may be detachable (not shown). Likewise, a hood may be designed to fold up along with the partially-silvered mirror.

Another telecamcorder (not illustrated) with a partially-silvered mirror angled outward from the display 100 may be constructed using a revolving positioning piece similar to that of FIG. 12. In this configuration the revolving positioning piece folds out by two extension arms on either side, enabling the camera to be aimed upward into the angled mirror. In camcorder mode, the arms return parallel to the main housing and lock in place with the revolving positioning piece on top.

Figure 21:
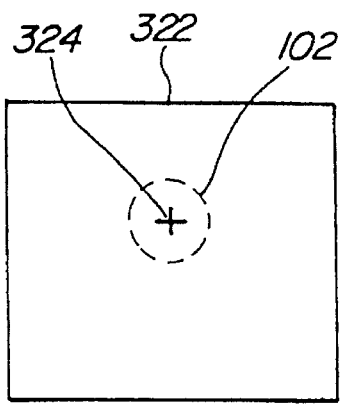
FIG. 21 illustrates a preferred placement of a telecamcorder camera when placed behind a semitransparent display.
Figure 22:
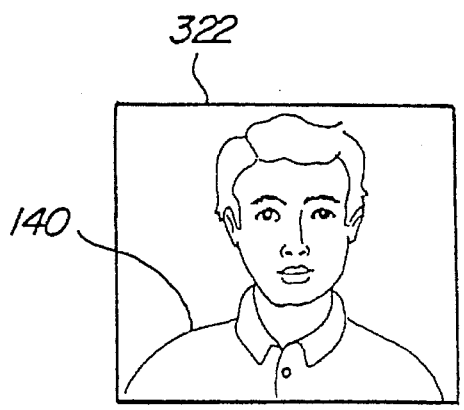
FIG. 22 illustrates a preferred displayed appearance of a conferee that can achieve eye contact with a local conferee.

A transparent screen can produce direct eye contact without the bulk of a semisilvered mirror. One method of using a transparent display to achieve eye contact uses a camera device (often a charge coupled device) that is integral to a semitransparent liquid crystal display. When a semitransparent display is used for teleconferencing, eye contact between conferees can readily occur. FIG. 21 shows the preferred placement of the camera 102 which is placed behind the viewing side of a transparent display 322. The camera 102 is pointed through the display 322 to capture the image of the conferee viewing the image of the distant conferee. A center 324 of the display 322 is a preferred position for the camera to ensure good eye contact. FIG. 22 illustrates the appearance of the conferee 140 imaged in the display 322. The conferee 140 appears to be looking directly forward because the camera 102 captures the conferee's image from a position directly behind the semitransparent display 322. When the conferee gazes at the screen image of the distant conferee, the conferee looks directly into the camera 102.

Semitransparent displays most often have synchronizing circuitry, so that the display can continuously switch between a normal display mode while the video camera is between video frames, and a transparent mode while the camera is capturing a video image frame. Thus, the camera is able to capture full motion video through the display at the same time as the display is reproducing full motion video from a remote source. Screen backlights may also be synchronized, so that they are on during the display mode to illumine the display. A synchronized shutter may be employed on the camera so that when the display is on, the camera and lens will not produce distracting reflections that mar the displayed image.

When a telecamcorder with a semitransparent screen is used in the camcorder mode, the camera must be removed from behind the display and the synchronizing circuit should be disabled because the synchronization process degrades, to a certain degree, the quality of the image signals. While in camcorder mode, the camera may either be directed away or through the semitransparent display. When directed through the semitransparent display, the display may be off or on and synchronized with the camera.

The semitransparent display may include a back plate to limit the amount of light striking the display from the rear. The camera can be mounted in a hole in the back plate to eliminate light leakage. A separate plug or mechanical cover plate is normally provided to eliminate the degradation of the image caused by light leakage when the camera is removed from behind the display.

Figure 23:
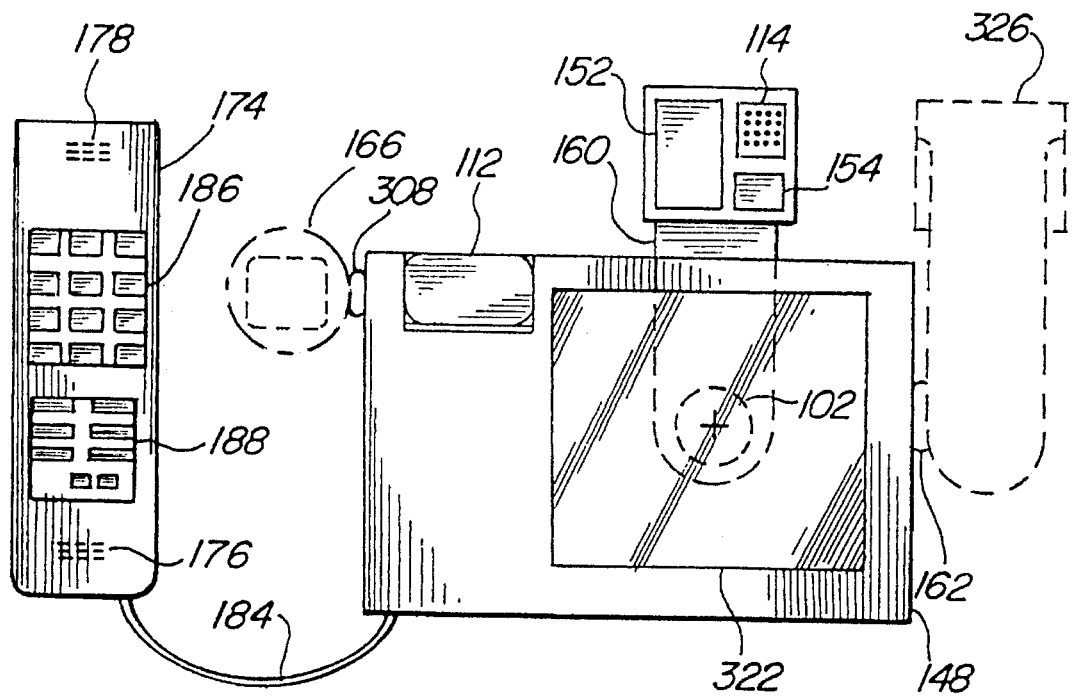
FIG. 23 illustrates a telecamcorder with a semitransparent display.
Figure 24:
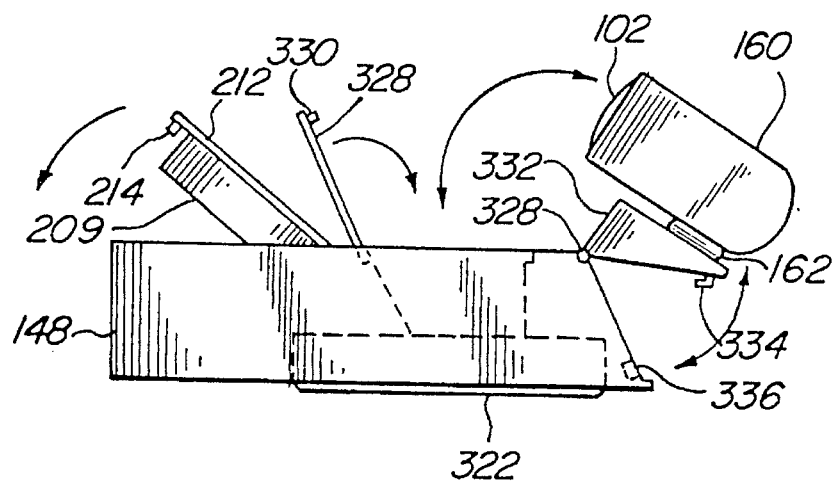
FIG. 24 illustrates a top view of the telecamcorder of FIG. 23.

An additional configuration of the telecamcorder of FIG. 8 is illustrated in FIG. 23. Here the telecamcorder has a camera 102 that is repositionable and is shown behind the semitransparent display 322. The camera 102, as here positioned, enables a local conferee to have eye contact with a distant conferee with a similar terminal. In the camcorder mode, the camera 102 may also be used in the position shown. The operator utilizes the viewfinder 166 that can be adjusted by the pivot 308. The hand grip 160 also carries, besides the camera 102, the light 152, the microphone 114, and the remote sensor 154. In camcorder mode, the handgrip 160 is adjusted to a position 326 by means of the hinge 328 as seen in FIG. 24. A repositionable speaker 112 connected to the main housing 148 may be repositioned if the telecamcorder is used with an external monitor that lacks a speaker. The optional phone handset 174 with the microphone 176 and the speaker 178 is connected by a line 184 to the main housing 148. The handset 174 may contain the network access (dialing) controls 186 and the telecamcorder controls 188 (these controls may alternatively reside solely or be duplicated on the main housing 148). The display 322 may also serve as the viewfinder when the camera 102 is not mounted behind the display 322.

FIG. 24 illustrates a top view of the telecamcorder of FIG. 23. This figure illustrates a mechanism for positioning the camera 102 either away from or behind the semitransparent display 322. A mechanical lid 328 with a latch 330 is connected to the main housing 148. The recording medium door 212 is attached to the main housing 148 and latched by the latch 214. The recording medium 209 is shown as removable. The camera 102 is attached to the hand grip 160 which is, in turn, connected to the pivot 162 to the main housing 148. The handgrip 160 with the camera 102 is attached to the main housing 148 by a hinge 328 on plate 332, which enables the camera to be readily positioned behind the display 322. The hand grip 160 with the camera 102 may also be locked by a latch 334 to a receptacle 336, which thus locks the unit in the camcorder mode.

Figure 25:
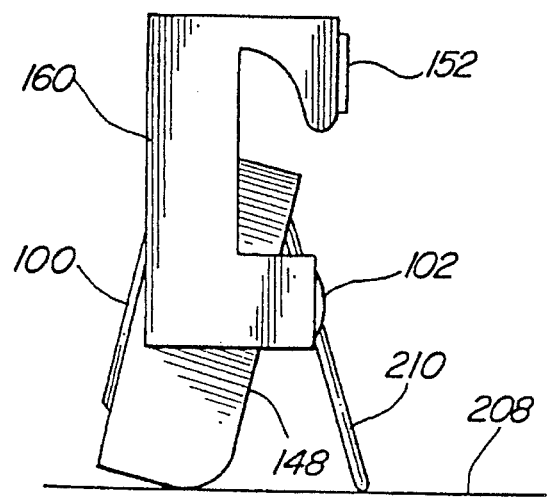
FIG. 25 illustrates a side view of the telecamcorder of FIG. 23.

FIG. 25 illustrates the telecamcorder of FIG. 23 when it is used with an external monitor and placed on a surface 208. The hand grip 160 may be positioned in any desired vertical direction to allow optimal image framing. The hand grip 160 includes the protruding light 152 and next to it the microphone 114, and the remote sensor 154 (both not shown) facing the same direction as the camera 102. An angle positioning arm 210 attached to the main housing 148 allows the optimal positioning of the display 322 and also may be used when the camera 102 is positioned behind the display 322 for teleconferencing.

Figure 26:
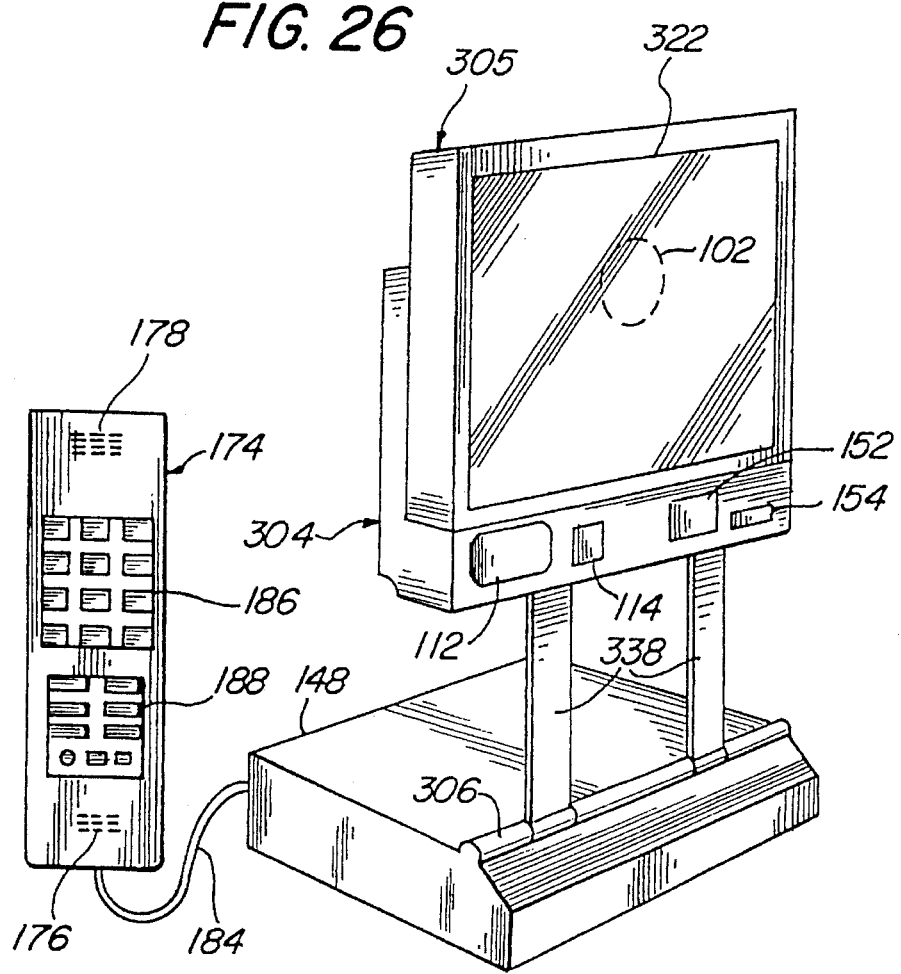
FIG. 26 illustrates a telecamcorder with a semitransparent display that may detach from the main housing and is raised for improved image capturing while conferencing.

Another configuration of the telecamcorder, with the various features and functional modes previously described, incorporates a semitransparent display that may be detached during camcorder operation. FIG. 26 shows a telecamcorder with a detachable semitransparent display 322 with the camera 102 mounted behind and aimed through the display 322. The display 322 is mounted to the hinged section 304 that contains the speaker 112, the microphone 114, the light 152, and the remote sensor 154. The main housing 148 is connected to the hinged section 304 by a hinge 306. In this configuration the display 322 and the camera 102 are elevated for improved framing of the conferee's image. A necessary electronic wire harness (not shown) is contained inside the sliding posts 338 and attaches to the main housing 148 through the hinge 306. The display can be positioned at a variety of heights and remains in position because the tight sleeves create friction in hinged section 304, thereby preventing it from sliding down posts 338. The optional separate phone handset 174 with the microphone 176 and the speaker 178 are connected by the line 184 to the main housing 148. The handset 174 may contain the network access (dialing) controls 186 and the telecamcorder controls 188. The controls 186 and 188 may also be duplicated or placed solely on the main housing 148.

Figure 27:
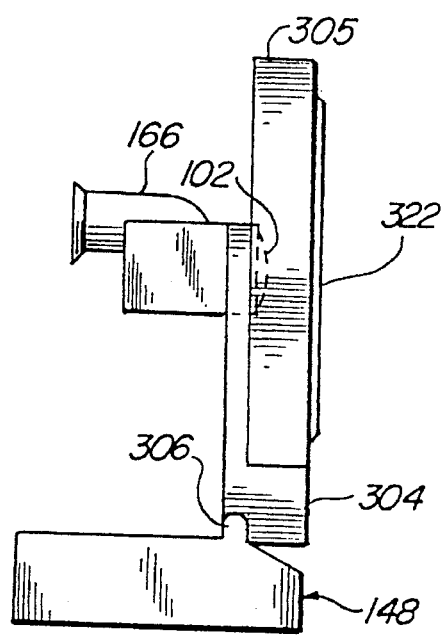
FIG. 27 illustrates a side view of the telecamcorder of FIG. 26 in teleconferencing mode.

A side view of the telecamcorder of FIG. 26 in teleconferencing mode is illustrated in FIG. 27. Here the main housing 148 contains essential camcorder and teleconferencing components and is connected by a hinge 306 to a hinged section 304 that has the display 322 mounted to it, thereby allowing the display 322 to be positioned for comfortable viewing. The camera 102 is directed through the display 322. The viewfinder 166 is for use when the telecamcorder is employed in the camcorder mode.

Figure 28:
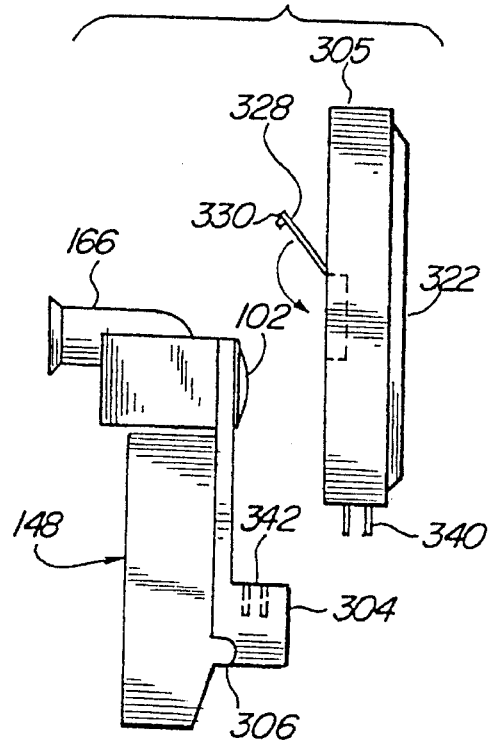
FIG. 28 illustrates a side view of the telecamcorder of FIG. 26 in camcorder mode with the display detached.

A side view of the telecamcorder of FIG. 26 in the camcorder mode is illustrated in FIG. 28. Here, the main housing 148 closes on the hinged section 304 that has connected to it the camera 102 and the viewfinder 166. The display 322 and its housing 305 has been detached from the hinged section 304 by detaching a connector 340 from a receptacle 342. The display 322 may serve as a self-contained display operable apart from the camera 102 and when operated in such a way, a lid 328 is latched by a latch 330 to display 322 and housing 305 to prevent environmental light from entering and degrading display image quality. A synchronized opaque/transparent shutter may also be used in opaque mode instead of a lid to limit light from entering behind the display (not shown).

Because video signals have a very high data rate, band width remains a concern in video telephony. Compression/decompression schemes are numerous and currently essential for phone network teleconferencing. With a fiberoptic infrastructure permitting consumer direct access, compression and decompression schemes may not be as necessary. However, it may be some time before such a fiberoptic network is universally available. Fortunately, full motion and real-time images can be successfully transmitted, received, and displayed over ordinary phone lines through the use of conventional compression technology. However, such "ordinary phone line" systems often must use several phone lines at one time to achieve adequate image quality. This can make teleconferencing very expensive, especially over long distances. Recent advances in compression technology promise full motion, real-time teleconferencing using a single phone line, cable, or wireless broadcast. Such advanced digital compression formats use small ASIC chips for compression and decompression. These chips can readily be built into a telecamcorder.

Like most conventional camcorders, the telecamcorder is designed to run on low voltage provided by batteries. An external transformer is used to reduce line voltage to charge the batteries. The transformer may be integral to the camcorder. More commonly, the transformer will be housed in a separate package, so that the size and weight of the telecamcorder is minimized. The telecamcorder may be powered either by the battery or by an electrical outlet while in either camcorder mode or in teleconferencing mode. To conserve battery power, the larger teleconferencing display may be operational only when the unit is powered by an outlet. In such a case the display is disabled while in portable camcorder mode and the user must rely on a small electronic or optical viewfinder for image framing.

It is also possible to make use of a large external display for group teleconferences or other instances where the conferees are too far from the built-in display to see it clearly. To make the use of an external display more convenient, the telecamcorder may contain an automatic on/off switch for powering the large external display. This enables the external display to switch on automatically whenever the telecamcorder receives the incoming signal or transmits the outgoing signal. The switch can be activated at the moment the incoming signal is identified (i.e., at the first ring), thus allowing the external display to warm up before the incoming transmission begins. The switch can be designed to turn on as soon as the telecamcorder device starts dialing to allow the external display a chance to warm up during the dialing process. The auxiliary switch may be contained within the main housing of the telecamcorder. The switch may alternatively be attached to or combined with the separate transformer. At times, it may be desired to override the switch so that the power remains on after the video telephone transmission has been completed. This override feature allows the television, computer, or other external display to carry out its normal function rather than serving as the display for a teleconferencing system.

Optimal framing of the conferee as the conferee moves at a distance from the terminal presents the problem of the conference being interrupted to reposition the camera. This is especially true if the telecamcorder is used with an external display, such as a television where conferees are able to view the television display from several feet away. Remotely-controlled zooming of the camera can be added to solve part of this problem, but zooming does not allow vertical and horizontal redirection of the camera. A tripod 132 of FIG. 3 allows both vertical and horizontal aiming of the camera, but the conferee must still leave his or her conferencing position to manipulate the camera. To correct this problem, motors can be provided in the telecamcorder to aim the camera while the rest of the unit remains stationary. The aiming controls may be on the telecamcorder or remote from the telecamcorder and connected by a cable or by wireless means. This will enable the conferee to remain in a desired position and aim the camera with smooth simultaneous 220 or more degrees rotation and more than 50-degree up and down motion, which allows complete vertical and horizontal aiming of the camera. A memory system can store preselected location so that with a simple command the camera will automatically seek the location. The motorized camera aiming may be used in camcorder mode or be disengaged for manual operation. A distant terminal may also control the aiming of the camera if so desired.

Figure 29:
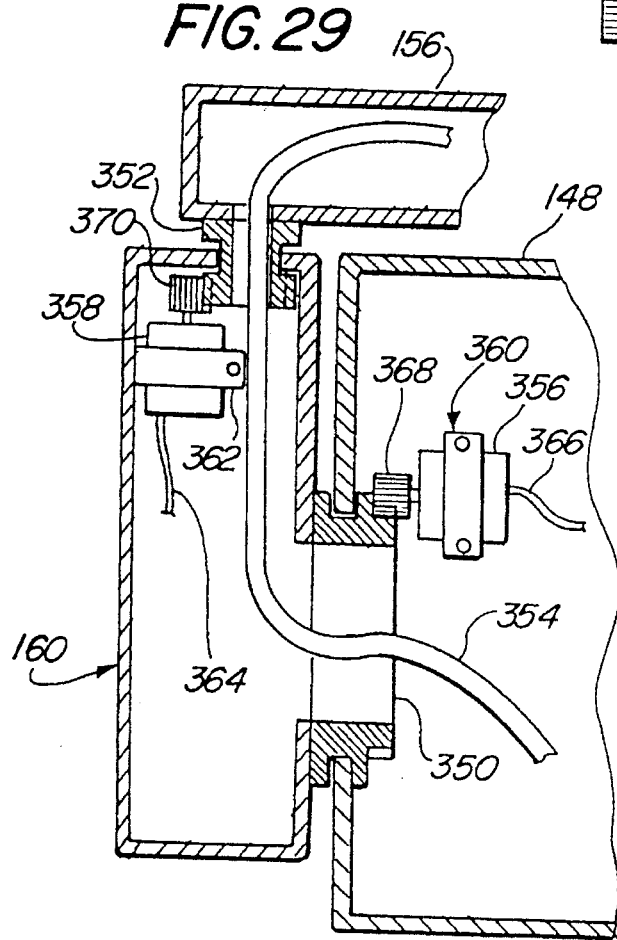
FIG. 29 illustrates a telecamcorder with a camera that, can be aimed by remote control.

FIG. 29 illustrates an internal sectional view of the telecamcorder of FIG. 8 that controls the aiming of the camera by mechanical and electrical means. The housing 148 has mounted to it, by a mount 360, a motor 356. A power wire 366 engages the motor in either direction on command. A grooved sprocket mates the grooves of the pivot 350 which is held in place by a hole and spins freely by the main housing 148 wall. The pivot 350 connects directly to the handgrip 160 that contains a second motor 358 held in place by a mount 362 and powered by the power line 364. A grooved sprocket 370 mates a grooved pivot 352 which spins freely and is held in place by the wall of the hand grip 160. The pivot 352 is connected to the camera boom 156 which carries the camera 102 (not shown), thereby allowing horizontal and vertical aiming of the camera. An electronic wire harness 354 connects the electronics of the camera boom 156 to the main housing 148. All of the telecamcorder configurations that do not use a camera boom may include this system. Some configurations may not allow as great a movement as the camera boom 156, but such movement is rarely needed. Thirty degrees movement in any given direction is adequate for the majority of teleconferencing situations.

Another framing problem occurs when the conferee moves about and leaves an area imaged by the camera. A base for carrying a camera is commercially available, so that a person is automatically tracked by the means of a homing device placed on or held by the person. This system has the disadvantages of bulk, weight, and expense. Utilizing the mechanical and electrical aiming means previously described reduces these limitations greatly. Tracking by the means of a homing device placed on or held by the conferee and then locating the homing device's position by triangulating with common sensors on the main housing enables the telecamcorder to automatically track a conferee as he/she moves about. The tracking controls are best used remotely, connected by wireless means or by cable, but they may also be located on the main housing. A distant terminal may also have access to the tracking controls if so desired. Useful features include control over the speed of tracking responsiveness and a central area within an imaged frame that is immune to the tracking response to eliminate excessive camera movement.

When the telecamcorder uses a television set as an external monitor, a built-in television tuner can allow the unit to automatically display the signal on the external monitor on a preselected channel. This allows the use of an external monitor that does not have a "video-in" input to receive the television-out signal from the telecamcorder. Features like picture-in-picture, where a conferee image appears in a window overlaid on a television picture, allows the conferee to converse with a distant party and simultaneously keep abreast of the latest television programs. In such a situation, the audio signals may be mixed or either the television audio or the distant conferee's audio may be suppressed. In addition, the telephone rings can be displayed visually in the television picture. The built-in tuner also may be used to view television programs on the built-in teleconferencing display. It is a simple modification to employ the recording section of the telecamcorder as a VCR and record television programs. With the addition of a clock and circuitry, well known to those skilled in the art, television signals may be automatically recorded in a similar manner as a VCR, but employing the recording medium of the telecamcorder (i.e., an optical disk).

Numerous teleconferencing features well known in the art may be applied as desired to the telecamcorders functioning. Auto-dial, holding, multiple line holding, visual control prompts on the display, touch screen controls, remote controlled panning, tilting, and zooming of the teleconferencing camera, an automatic moving display that tracks a conferee as he/she moves about, camera and light positioning to read documents laid flat on a surface, and additional technologies to ensure eye contact, among numerous other well-known teleconferencing features, may be included within the telecamcorder of the present invention.

An enhanced digitally-based telecamcorder may include microprocessors for operational functions. The digital storage may be used as a computer peripheral with modem data transmission and reception of data other than audio and video. Specific software for telecamcorder functioning, special effects, titling, and other functions may be downloadable and stored on the digital storage device. Specific digital convenience features, such as digital day timers, calculators, digital memo beepers, and personal digital assistants, may also be integrated and rely on the digital storage device. Other convenience features, such as high-quality audio recording and playback, whereby the built recording device may be used as a portable stereo, may be included. Also, connections for external headphones, microphones, speakers, lights, recording devices, special effects devices, etc. can be added as desired.

Figure 30:
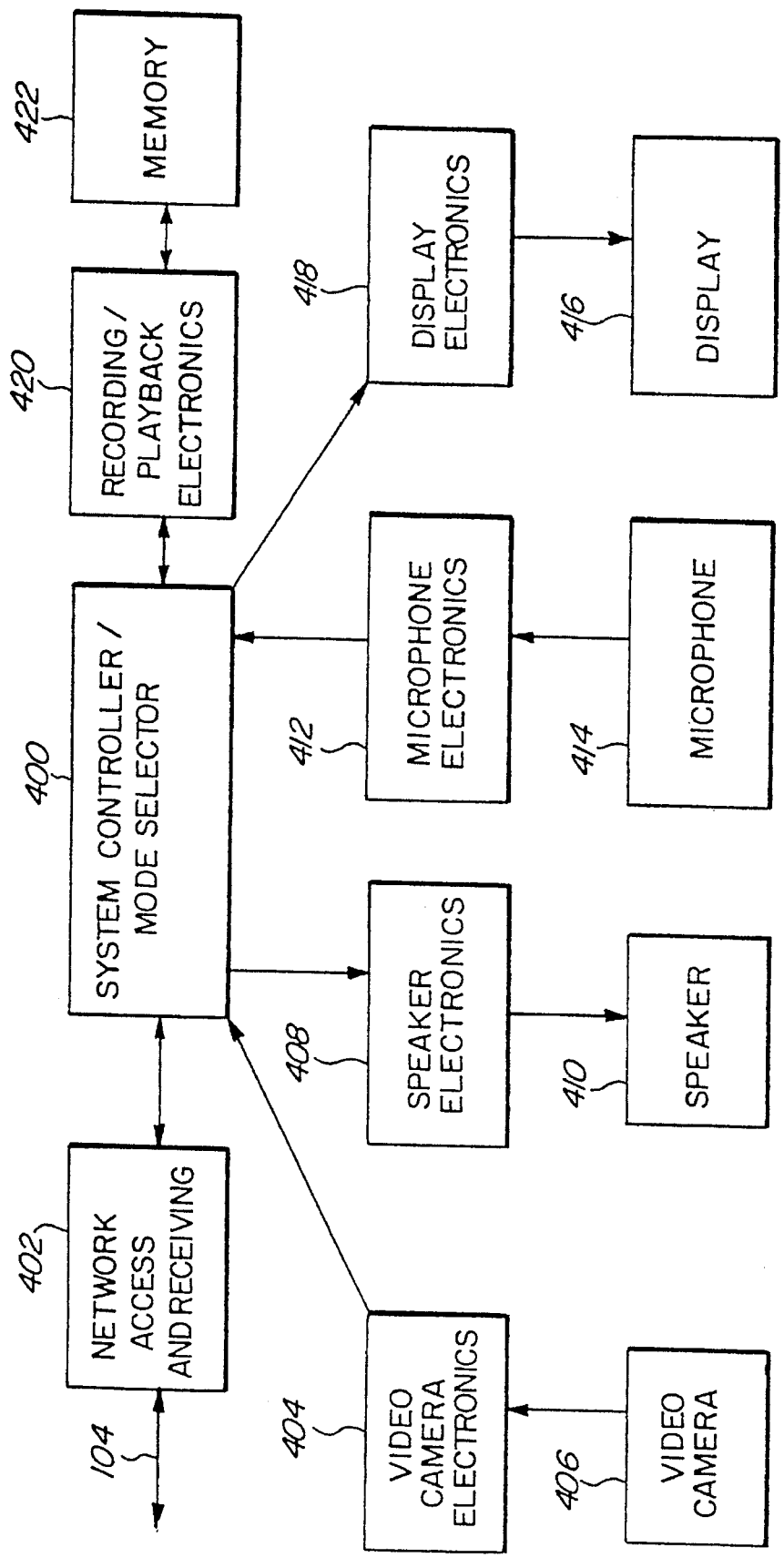
FIG. 30 represents a block diagram of a telecamcorder of the present invention.

Although many features may be added to the telecamcorder, as has just been detailed, a basic functional diagram of the device is straightforward. There are essentially two basic functional layouts: a telecamcorder and a telecamcorder with answering machine functions. FIG. 30 presents a block diagram of a simple telecamcorder. The heart of the unit is a system controller/mode selector 400. This section mediates data flow in the telecamcorder, and all the other sections of the device feed into the controller 400. Video images are captured by a video camera 406 which is connected to video camera electronics 404. The video camera electronics 404 provides the video camera 406 with proper supply voltages and control signals and processes the output of the camera 406 into a final video signal to be fed to the controller 400. Similarly, a microphone 414 and microphone electronics 412 provide an audio signal which is fed to controller 400.

If the telecamcorder is being used to make a recording, the controller 400 conditions the audio and video signals, if necessary, and routes them to a recording/playback electronics package 420. The recording electronics 420 processes the signals for storage in memory 422. The memory 422 actually comprises any type of data recording medium ranging from tape and disks to solid state microelectronic memory. The recording electronics 420 vary according to the exact type of memory 422 employed. The controller 400 also sends appropriate control signals (such as rewind in the case of a tape memory) to the recording electronics 420. Similarly, if the unit is used in the teleconferencing mode, the controller 400 routes the signal to a network access or communication electronics package 402. This electronics package establishes contact with a network and sends properly processed audio and video signals to the network through a connection 104 and received audio and video through the same connection 104. The system controller 400 routes the received signals to speaker electronics 408 and a speaker 410 for audio reproduction and display electronics 418 and a display 416 for display of video.

Figure 31:
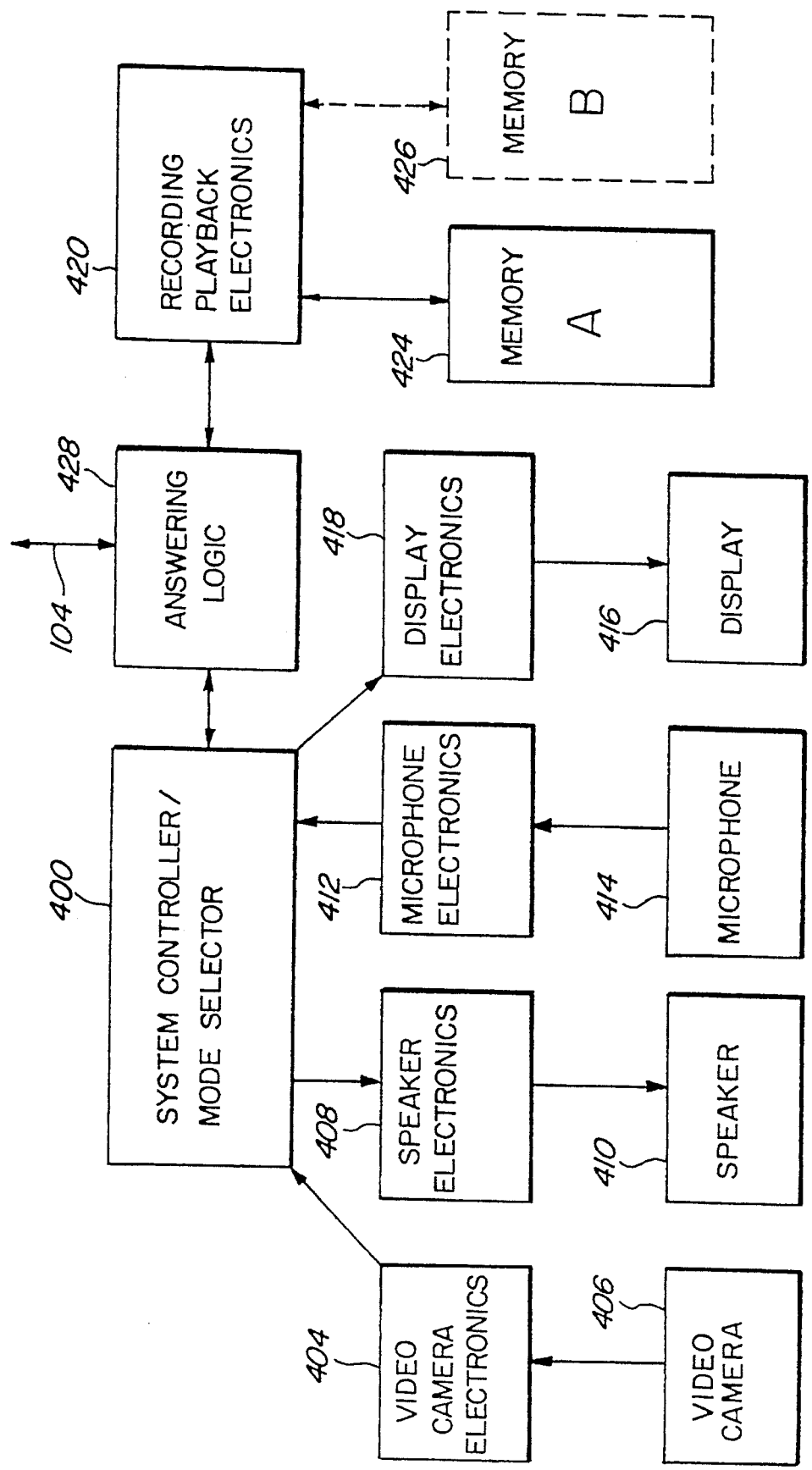
FIG. 31 represents a block diagram of a telecamcorder with answering machine functions.

An answering machine version of the present invention is diagrammed in FIG. 31. It operates in substantially the same manner as explained for FIG. 31. However, the network access electronics 402 have been replaced with answering logic 428. When the system is used to record, it operates as explained above. The system controller routes the signal to the recording electronic 420 through the answering logic 428 which is passive in the normal record mode. The information is recorded in memory A 424. However, when the telecamcorder is used to record an outgoing message, the answering logic 428 and the recording electronics 420 cooperate to record the message on a special memory shown as memory B 426 (dotted lines). The special memory may be completely separate from the normal memory A 424 or, as explained above, may represent a special partition or region within the normal memory A 424.

When the telecamcorder is used as a video answering machine all the electronics, with the exception of the answering logic 428 and the recording electronics 420, can be dormant. Alternatively, the other electronics may remain active so an incoming message can be viewed. In either case, the answering logic, which is connected to the network through connection 104, automatically establishes a connection with the network when it detects a "ring." The logic 428 orders the recording electronics 420 to play the outgoing message which is sent out connection 104 to a remote terminal. At the same time, any incoming signal is recorded in the normal memory A 424. When the units owner returns later, the messages can be played back through the speaker 410 and display 416. Generally, all the controls for the entire process are located on the system controller 400.

Those skilled in the art will appreciate that various adaptations and modifications of the just-described preferred embodiments which can be configured without departing from the scope and spirit of the invention. Therefore, it is to be understood that, within the scope of the appended claims, the invention may be practiced other than as specifically described herein.

What is claimed is:

1. A portable powered video camera device adjustable for producing and playing back video recordings and for acting as a video telephone to permit video telephone conversations between a first party using the device and a second party using a remotely-located communicating device, the device comprising:

video display means for providing a display used for playing back video recordings and for displaying a video signal transmitted from the remotely-located device during video telephone conversations;

video pickup means physically redirectable into a first configuration for capturing of an image of the first party facing a front surface of the video display means, and a second configuration for capturing an image of objects facing a rear surface of the video display means, the captured images for furnishing video signals to be transmitted to the second party using the remotely-located communicating device and to be stored as video recordings;

viewfinder means for aiming the video pickup means;

audio pickup means for providing an audio signal for video recordings and for providing an audio signal of the first party for transmission to the second party during video telephone conversations;

sound production means for providing an audible rendition of the audio signal during playing back video recordings and for providing an audible rendition of the audio signal transmitted from the remotely-located device during video telephone conversations;

recording means for recording and playing back video recordings;

communication means for manually establishing connection with the remotely-located device, for transmitting and receiving audio and video signals to and from the remotely-located device, and for indicating when the remotely-located device attempts to establish connection; and control means for controlling the communication means and the recording means.

2. The portable video camera device of claim 1, wherein the video display means comprises a display screen that is removable to reduce weight and battery drain when the device is being used as a portable camcorder.

3. The portable powered video camera device of claim 1, wherein the viewfinder means is removable.

4. The portable powered video camera device of claim 1, wherein both the viewfinder means and the video display means are provided by the same video display.

5. The portable powered video camera device of claim 1, wherein the viewfinder means comprises an electronic display substantially, smaller than the display means, for use when the device is used as a camcorder.

6. The portable powered video camera device of claim 1, wherein the viewfinder means comprises a small optical device for use when the device is used as a camcorder.

7. The portable powered video camera device of claim 1, further comprising a remote control unit, separate from the camera device, comprising:
   controls for manually establishing a connection with the remotely-located teleconferencing device; and
   a speaker and a microphone for allowing a conversation between the first party using the control unit and the second party at the remotely-located teleconferencing device.

8. The portable powered video camera device of claim 7, further comprising electronics and antennae to establish a wireless link between the control unit and the camera device.

9. The portable powered video camera device of claim 1, further comprising a remote control unit for controlling the recording means.

10. The portable powered video camera device of claim 1, further comprising a remote control unit for controlling the video pickup means.

11. The portable powered video camera device of claim 1, further comprising a partially reflective mirror positioned to allow the video pickup means to capture a reflected image of the first party viewing the video display means.

12. The portable powered video camera device of claim 11, wherein the partially reflective mirror is removably attached to a main housing of the video camera device.

13. The portable powered video camera device of claim 1, further comprising raising means for elevating the device above a supporting surface.

14. The portable powered video camera device of claim 13, wherein the raising means elevates at least the display means and the video pickup means.

15. The portable powered video camera device of claim 1, further comprising answering means for activating the communication means to automatically establish a connection with the remotely-located device when the communication means indicates that the remotely-located device is requesting connection, for activating the recording means to play back a recorded message to the remotely-located device, and for activating the recording means to record an incoming message from the remotely-located device.

16. The portable powered video camera device of claim 1, wherein the display means further comprises a semitransparent screen and the device further includes means to position the video pickup means to videograph through the semitransparent screen and electronics to optimize such videographing.

17. A portable powered video camera device adjustable for producing and playing back video recordings, for acting as a video telephone to permit video telephone conversations between a first party using the device and a second party using a remotely-located communicating device, and for acting as a video answering machine transmitting a recorded message to and recording a message from the remotely-located communicating device, the device comprising:
   video display means for providing a display used for playing back video recordings and for displaying a video signal transmitted from the remotely-located device during video telephone conversations;
   video pickup means physically redirectable into a first configuration for capturing an image of the first party facing a front surface of the video display means, and a second configuration for capturing an image of objects facing a rear surface of the video display means, the captured images for furnishing video signals to be transmitted to the second party using the remotely-located communicating device and to be stored as video recordings;
   viewfinder means for aiming the video pickup means;
   audio pickup means for providing an audio signal for video recordings and for providing an audio signal of the first party for transmission to the second party during video telephone conversations;
   sound production means for providing an audible rendition of the audio signal during playing back video recordings and for providing an audible rendition of the audio signal transmitted from the remotely-located device during video telephone conversations;
   communication means for automatically establishing connection with the remotely-located device, for transmitting and receiving audio and video signals to and from the remotely-located device;
   recording means for recording and playing back video recordings; and
   answering means for activating the communication means to automatically establish a connection with the remotely-located device when the communication means indicates that the remotely-located device is requesting connection, for activating the recording means to play back a recorded message to the remotely-located device, and for activating the recording means to record an incoming message from the remotely-located device.

18. The portable powered video camera device of claim 17 further comprising a partially reflective mirror positioned to allow the video pickup means to capture a reflected image of the first party viewing the video display means.

19. The portable powered video camera device of claim 18, wherein the partially reflective mirror is removably attached to a main housing of the video camera device.

20. The portable video camera device of claim 17, wherein the video display means comprise a display screen that is removable to reduce weight and battery drain when the device is being used as a portable camcorder.

21. The portable powered video camera device of claim 17, wherein the viewfinder means is removable.

22. The portable powered video camera device of claim 17, wherein the viewfinder means comprises an electronic display substantially, smaller than the display means, for use when the device is used as a camcorder.

23. The portable powered video camera device of claim 17, wherein the viewfinder means comprises a small optical device for use when the device is used as a camcorder.

24. The portable powered video camera device of claim 17, wherein both the viewfinder means and the video display means are provided by the same video display.

25. The portable powered video camera device of claim 17, further comprising controls for manually establishing a connection with the remotely-located teleconferencing device and means for indicating when the remotely-located device is requesting connection.

26. The portable powered video camera device of claim 17, further comprising a remote control unit, separate from the camera device, comprising:
   controls for manually establishing a connection with the remotely-located teleconferencing device; and
   a speaker and a microphone for allowing a conversation between the first party using the control unit and the second party at the remotely-located teleconferencing device.

27. The portable powered video camera device of claim 26, further comprising electronics and antennae to establish a wireless link between the control unit and the camera device.

28. The portable powered video camera device of claim 17, further comprising a remote control unit for controlling the recording means.

29. The portable powered video camera device of claim 17, further comprising a remote control unit for controlling the video pickup means.

30. The portable powered video camera device of claim 17, further comprising raising means for elevating the device above a supporting surface.

31. The portable powered video camera device of claim 30, wherein the raising means elevates at least the display means and the video pickup means.

32. The portable powered video camera device of claim 17, wherein the display means further comprises a semi-transparent screen and the device further includes means to position the video pickup means to videograph through the semitransparent screen and electronics to optimize such videographing.

33. A portable powered video camera device adjustable for producing and playing back video recordings and acting as a video telephone to permit video conversations between a first party using the device and a second party using a remotely-located communicating teleconferencing device, the video camera device comprising:

a main housing having a front surface, a rear surface substantially parallel to the front surface, a first lateral surface, a second lateral surface, a top surface, and a bottom surface;

a hand grip pivotally attached to the first lateral surface;

a camera boom pivotally attached to the hand grip so that a surface of the boom can be pivoted to face a direction faced by the front surface and can be pivoted to face a direction faced by the rear surface;

a video camera and lens mounted on the camera boom for providing an image for a video recording and for providing an image of the first party for transmission to the second party during video telephone conversations;

a video display screen forming part of the front surface of the main housing to act as a viewfinder, to display video recordings during playback and to display transmissions from the remotely-located teleconferencing device during video telephone conversations;

a microphone mounted on the camera boom for providing an audio signal for video recordings and for providing an audio signal of the first party for transmission to the second party during video telephone conversations;

a speaker for providing an audible rendition of audio signals from playback of video recordings and from the remotely-located device during video telephone conversations;

recording means for recording and playing back audio and video signals as video recordings; and communication electronics for calling the remotely-located teleconferencing device, for transmitting and receiving audio and video signals to and from the remotely-located device, and for providing a ringer device for indicating when the remotely-located device is calling.

34. The portable powered video camera device of claim 33, further comprising a separate remote control unit comprising:

controls for manually establishing a connection with the remotely-located teleconferencing device; and a speaker and a microphone for allowing a conversation between the first party using the control unit and the second party at the remotely-located teleconferencing device.

35. The portable powered video camera device of claim 34, further comprising electronics and antennae to establish a wireless link between the control unit and the main housing.

36. The portable powered video camera device of claim 33, further comprising a remote control unit for controlling the recording means.

37. The portable powered video camera device of claim 33, further comprising a remote control unit for controlling the video camera and lens.

38. The portable powered video camera device of claim 33, further comprising raising means for elevating the device above a supporting surface.

39. The portable powered video camera device of claim 38, wherein the raising means elevates at least the display screen and the video camera.

40. The portable powered video camera device of claim 33, further comprising a separate viewfinder for aiming the camera.

41. The portable powered video camera device of claim 33, further comprising answering means for activating the communication electronics to automatically establish a connection with the remotely-located device when the ringer device indicates that the remotely-located device is calling, for activating the recording means to play back a recorded message to the remotely-located device, and for activating the recording means to record an incoming message from the remotely-located device.

42. A portable powered video camera device adjustable for producing and playing back video recordings, for acting as a video telephone to permit video conversations between a first party using the device and a second party using a remotely-located communicating teleconferencing device, the video camera device comprising:

a main housing having a front surface, a rear surface substantially parallel to the front surface, a first lateral sidewall, a second lateral sidewall, a top sidewall, and a bottom sidewall;

mounting members disposed at a first end and a second end of the top sidewall and projecting out from the top sidewall at right angles to the top sidewall;

a positioning piece disposed between the mounting members and pivotally mounted to the mounting members so that the positioning piece can be rotated at least 180 degrees;

a rotating handle connected to the positioning piece through one of the mounting members, the positioning piece rotating when the handle is turned;

a video camera and lens mounted on the positioning piece and physically redirectable by rotation of the positioning piece from a first position in which the video camera captures images of objects facing the front surface of the main housing to a second position in which the video camera captures images of objects facing the rear surface of the main housing for providing images of a first party for transmission to a second party during video telephone conversations and images for recording during video recording, respectively;

a microphone mounted on the positioning piece for providing an audio signal for video recordings and for providing an audio signal of the first party for transmission to the second party during video conversations;

a video display screen forming part of the front surface of the main housing to act as a viewfinder and to display the video recording during playback and to display an image transmitted from the remotely-located teleconferencing device during video conversations;

a speaker for providing an audible rendition of the audio signal for playing back video recordings and for providing an audible rendition of the audio signal transmitted from the remotely-located device during video conversations;

recording means for recording and playing back audio and video signals; and communication electronics including a telephone dial for calling the remotely-located teleconferencing device, electronics for transmitting and receiving audio and video signals to and from the remotely-located device and a ringer device for indicating when the remotely-located device is calling.

43. The portable powered video camera device of claim 42, further comprising a separate remote control unit comprising:

controls for manually establishing a connection with the remotely-located teleconferencing device; and a speaker and a microphone for allowing a conversation between the first party using the control unit and the second party at the remotely-located teleconferencing device.

44. The portable powered video camera device of claim 43, further comprising electronics and antennae to establish a wireless link between the control unit and the main housing.

45. The portable powered video camera device of claim 42, further comprising a remote control unit for controlling the recording means.

46. The portable powered video camera device of claim 42, further comprising a remote control unit for controlling the video camera and lens.

47. The portable powered video camera device of claim 42, further comprising raising means for elevating the device above a supporting surface.

48. The portable powered video camera device of claim 47, wherein the raising means elevates at least the display screen and the video camera.

49. The portable powered video camera device of claim 42, further comprising a separate viewfinder for aiming the camera.

50. The portable powered video camera device of claim 42, further comprising answering means for activating the communication electronics to automatically establish a connection with the remotely-located device when the ringer device indicates that the remotely-located device is calling, for activating the recording means to play back a recorded message to the remotely-located device, and for activating the recording means to record an incoming message from the remotely-located device.

51. A portable powered video camera device adjustable for producing and playing back video recordings, for acting as a video telephone to permit video conversations between a first party using the device and a second party using a remotely-located communicating teleconferencing device, the video camera device comprising:

a main housing having a front surface, a rear surface substantially parallel to the front surface, a first lateral sidewall, a second lateral sidewall, a top sidewall, and a bottom sidewall;

a turret piece pivotally mounted to the top sidewall so that the turret piece can be rotated at least 180 degrees;

a video camera and lens mounted on the turret piece, the video camera physically redirectable by rotation of the turret piece from a first position in which the video camera captures images of objects facing the front surface of the main housing to a second position in which the video camera captures images of objects facing the rear surface of the main housing for providing images of a first party for transmission to a second party during video telephone conversations and for providing images for recording during video recording, respectively;

a microphone mounted on the turret piece for providing an audio signal for video recordings and for providing an audio signal of the first party for transmission to the second party during video conversations;

a video display screen forming part of the first surface of the main housing to act as a view finder and to display the video recording during playback and to display a transmission from the remotely-located teleconferencing device during video telephone conversations;

a speaker for providing an audible rendition of the audio signal for playing back video recordings and for providing an audible rendition of the audio signal transmitted from the remotely-located device during video telephone conversations;

recording means for recording and playing back audio and video signals; and communication electronics including a telephone dial for calling the remotely-located teleconferencing device, electronics for transmitting and receiving audio and video signals to and from the remotely-located device and a ringer device for indicating when the remotely-located device is calling.

52. The portable powered video camera device of claim 51, further comprising a separate remote control unit comprising:

controls for manually establishing a connection with the remotely-located teleconferencing device; and a speaker and a microphone for allowing a conversation between the first party using the control unit and the second party at the remotely-located teleconferencing device.

53. The portable powered video camera device of claim 52, further comprising electronics and antennae to establish a wireless link between the control unit and the main housing.

54. The portable powered video camera device of claim 51, further comprising a remote control unit for controlling the recording means.

55. The portable powered video camera device of claim 51, further comprising a remote control unit for controlling the video camera and lens.

56. The portable powered video camera device of claim 51, further comprising raising means for elevating the device above a supporting surface.

57. The portable powered video camera device of claim 56, wherein the raising means elevates at least the display screen and the video camera.

58. The portable powered video camera device of claim 51, further comprising a separate viewfinder for aiming the camera.

59. The portable powered video camera device of claim 51, wherein the turret piece further comprises a pivot for vertically adjusting the video camera.

60. The portable powered video camera device of claim 51, further comprising answering means for activating the communication electronics to automatically establish a connection with the remotely-located device when the ringer device indicates that the remotely-located device is calling, for activating the recording means to play back a recorded message to the remotely-located device, and for activating the recording means to record an incoming message from the remotely-located device.

61. A portable powered video camera device for producing and playing back video recordings and for acting as a video telephone to permit video telephone conversations between a first party using the device and a second party using a remotely-located communicating device, the device comprising:

removable video display means for providing a display used for playing back video recordings and for displaying a video signal transmitted from the remotely-located device during video telephone conversations, the video display means comprising a display screen that is removable for use of the device as a camcorder;

video pickup means for furnishing video signals to be transmitted to the second party using the remotely-located communicating device and to be stored as video recordings;

viewfinder means for aiming the video pickup means when the device is used as a camcorder;

audio pickup means for providing an audio signal for video recordings and for providing an audio signal of the first party for transmission to the second party during video telephone conversations;

sound production means for providing an audible rendition of the audio signal during playing back video recordings and for providing an audible rendition of the audio signal transmitted from the remotely-located device during video telephone conversations;

recording means for recording and playing back video recordings; and communication means and controls for manually establishing connection with the remotely-located device, for transmitting and receiving audio and video signals to and from the remotely-located device, and for indicating when the remotely-located device attempts to establish connection.

62. The portable powered video camera device of claim 61, wherein the removable video display means is semi-transparent, allowing the video pickup means to capture an image through the video display means when the device is used as a video telephone.

63. The portable powered video camera device of claim 61, further comprising answering means for activating the communication means to automatically establish a connection with the remotely-located device when the communication means indicates that the remotely-located device is requesting connection, for activating the recording means to play back a recorded message to the remotely-located device, and for activating the recording means to record an incoming message from the remotely-located device.

64. The portable powered video camera device of claim 61, further comprising raising means for elevating the device above a supporting surface.

65. The portable powered video camera device of claim 64, wherein the raising means elevates at least the video display means and the video pickup means.

* * * * *